US012748010B2

(12) United States Patent
Forestelli

(10) Patent No.: US 12,748,010 B2
(45) Date of Patent: Sep. 29, 2026

(54) SYSTEM FOR DETECTING LEAKED GAS FROM CONTAINERS

(71) Applicant: FT SYSTEM SRL, Alseno (IT)

(72) Inventor: Fabio Forestelli, Alseno (IT)

(73) Assignee: FT SYSTEM SRL, Alseno (IT)

( * ) Notice: Subject to any disclaimer, the term of this patent is extended or adjusted under 35 U.S.C. 154(b) by 302 days.

(21) Appl. No.: 18/579,567

(22) PCT Filed: Aug. 12, 2022

(86) PCT No.: PCT/IB2022/057531
§ 371 (c)(1),
(2) Date: Jan. 16, 2024

(87) PCT Pub. No.: WO2023/021382
PCT Pub. Date: Feb. 23, 2023

(65) Prior Publication Data

US 2024/0319035 A1 Sep. 26, 2024

(30) Foreign Application Priority Data

Aug. 17, 2021 (IT) ........................ 102021000022004

(51) Int. Cl.
*G01M 3/22* (2006.01)

(52) U.S. Cl.
CPC .................................. *G01M 3/226* (2013.01)

(58) Field of Classification Search
CPC ..................................................... G01M 3/226
See application file for complete search history.

(56) References Cited

U.S. PATENT DOCUMENTS

| | | | |
|---|---|---|---|
| 3,729,984 | A | 5/1973 | Waldherr |
| 5,373,729 | A | 12/1994 | Seigeot |
| 2012/0037796 | A1 | 2/2012 | Lehmann |
| 2016/0349138 | A1 | 12/2016 | Fu |
| 2020/0264069 | A1 | 8/2020 | Schreiber |
| 2022/0221366 | A1 | 7/2022 | Forestelli |
| 2022/0228943 | A1 | 7/2022 | Forestelli |
| 2022/0228944 | A1 | 7/2022 | Forestelli |

FOREIGN PATENT DOCUMENTS

| | | | |
|---|---|---|---|
| CN | 112504573 | A | 3/2021 |
| WO | 2020/230068 | A1 | 11/2020 |

OTHER PUBLICATIONS

International Search Report and Written Opinion of the International Searching Authority issued for International PCT Application No. PCT/IB2022/057531 on Oct. 18, 2022.

*Primary Examiner* — Eric S. McCall
(74) *Attorney, Agent, or Firm* — Howson & Howson LLP

(57) ABSTRACT

A system for detecting leaks from containers is provided. The system comprises conveying means including at least one inlet conveyor belt and being configured to transport containers, already filled with a given food and sealed, to an inspection zone. The system further comprises an inspection apparatus, configured to test the tightness of containers arrived at the inspection zone. The inspection apparatus comprises extraction means and suction means, configured to induce the release of volatile substances from each container arrived at the inspection zone and suck in gas surrounding each of the containers and any volatile substances leaked from the containers. The inspection apparatus also including detection means configured to analyze the sucked-in gas and detect the presence of any volatile substances leaked from the containers.

20 Claims, 17 Drawing Sheets

[Fig. 1]
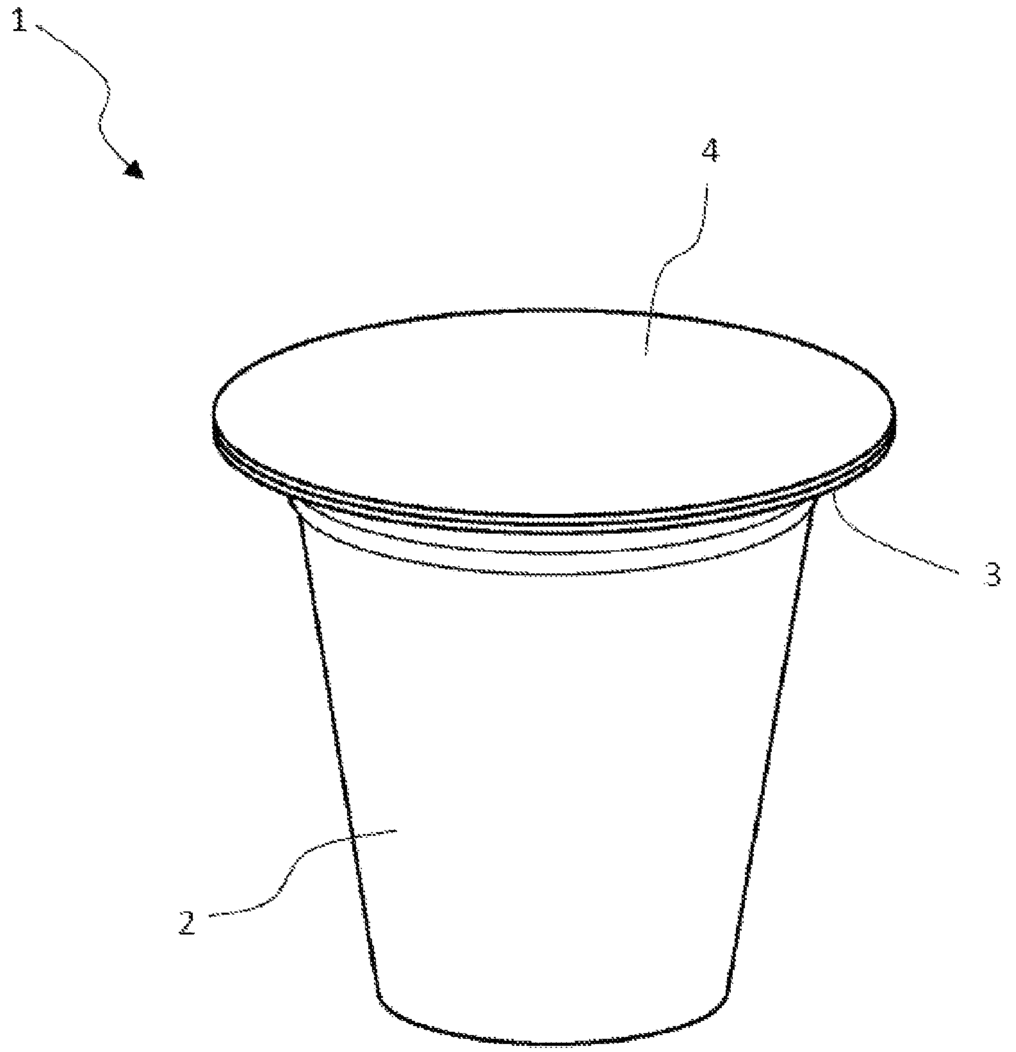

[Fig. 2]
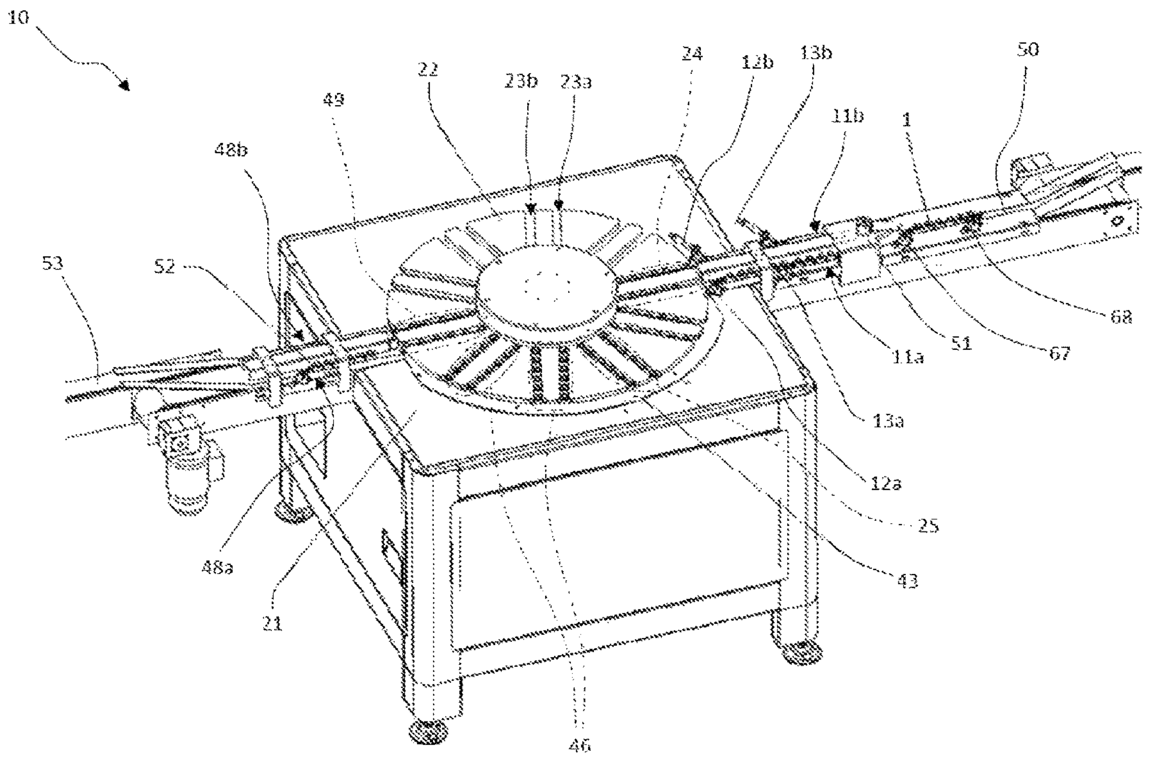
[Fig. 3]
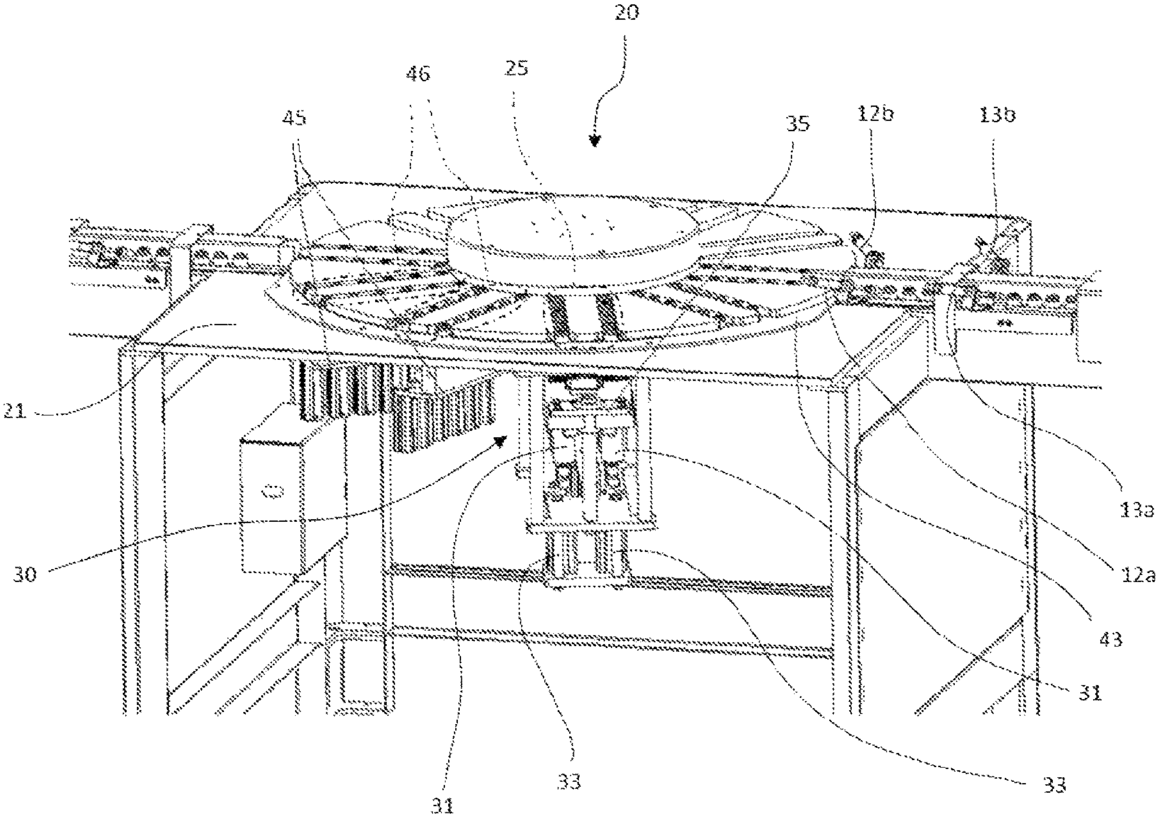

[Fig. 4]
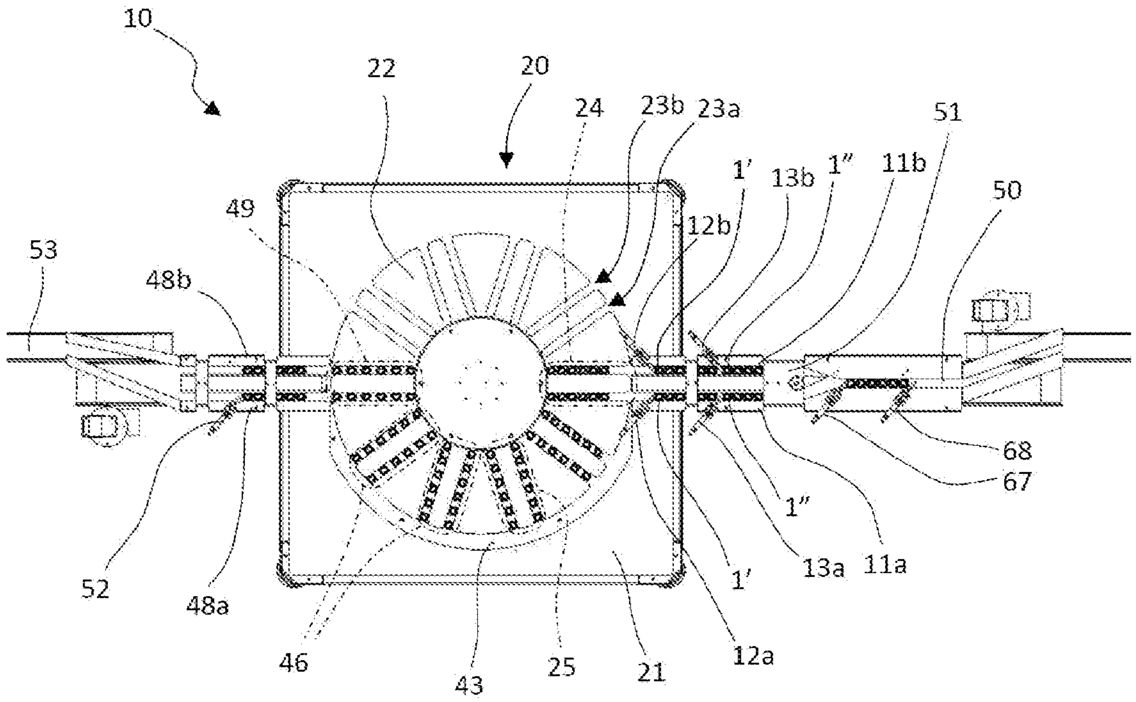
[Fig. 5]
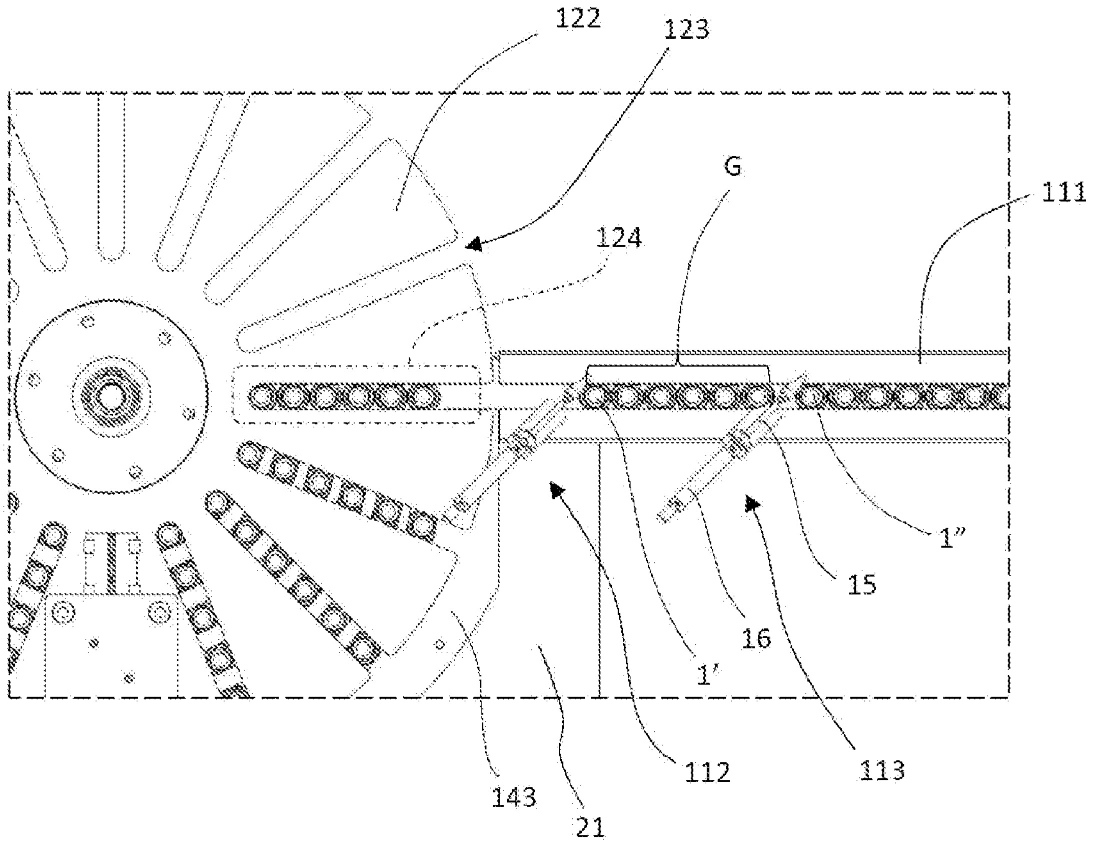

[Fig. 8b]
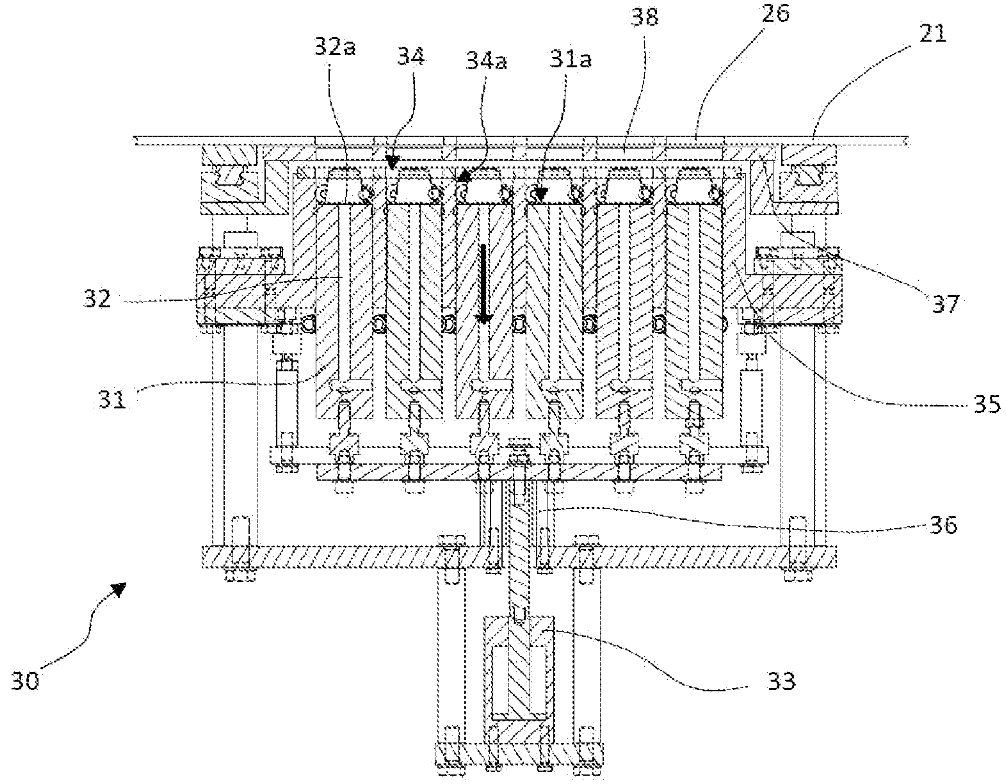
[Fig. 8c]
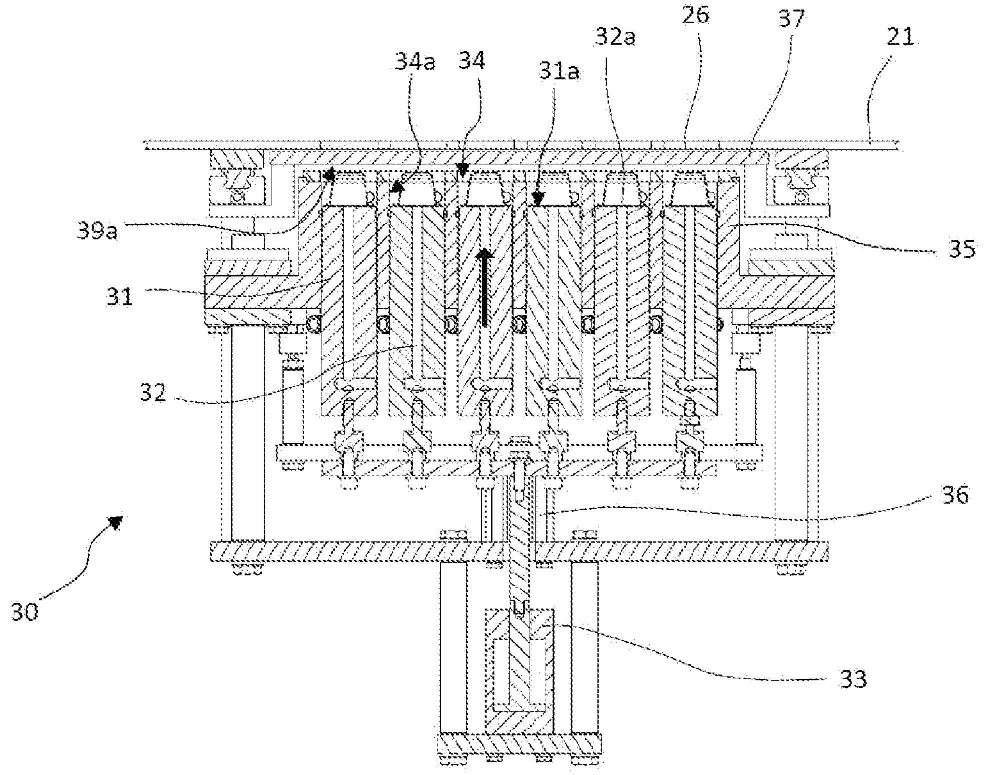

[Fig. 8d]
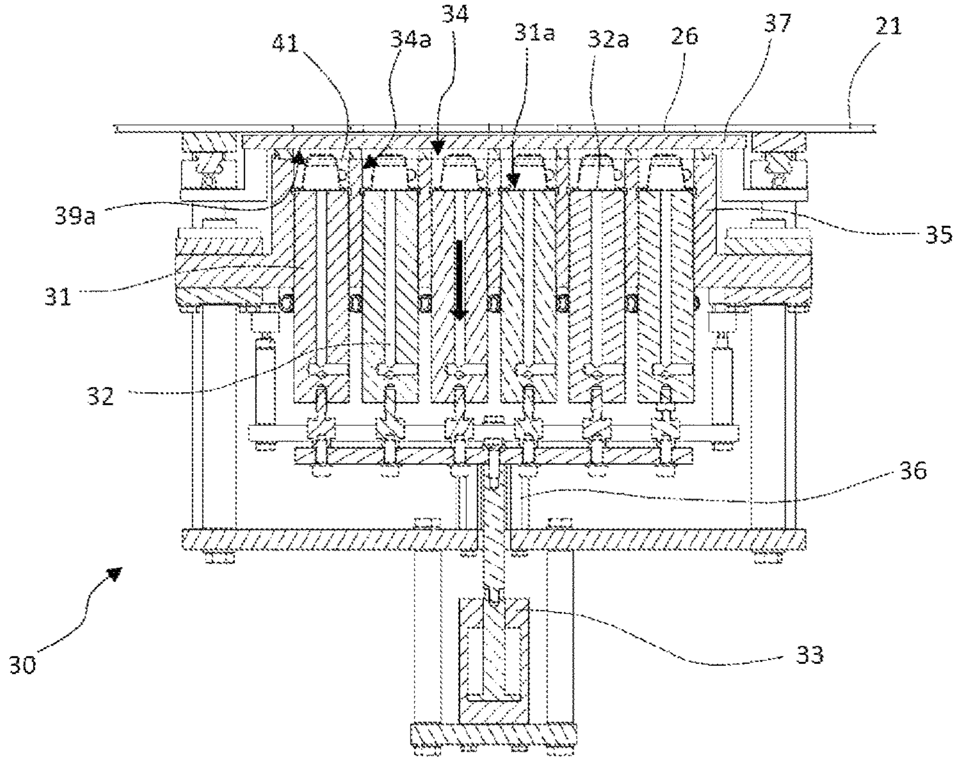
[Fig. 9]
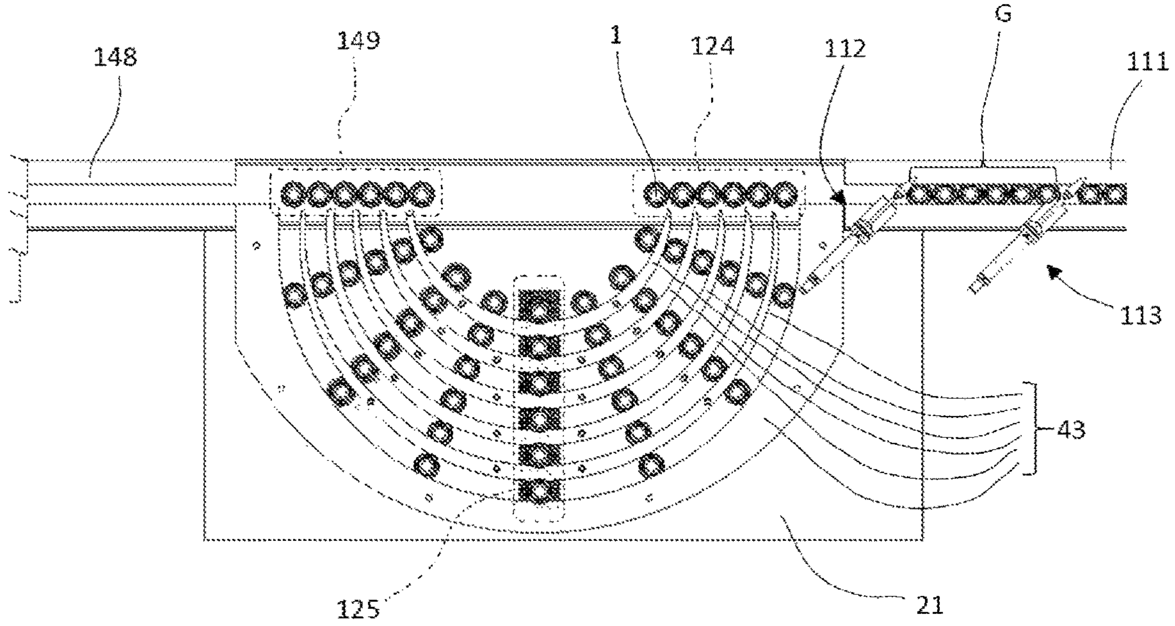

[Fig. 10]
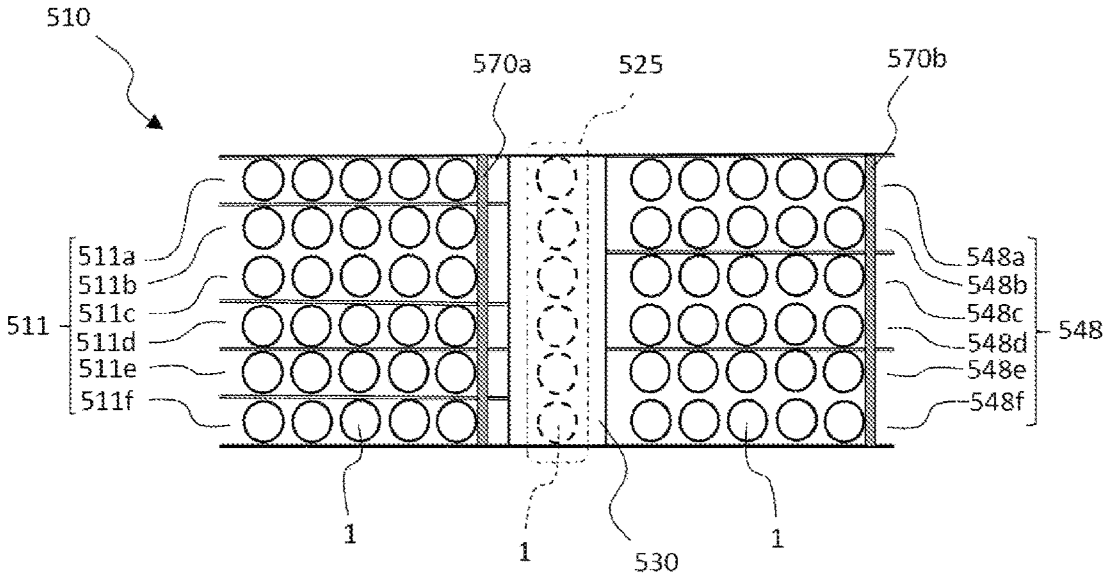
[Fig. 11]
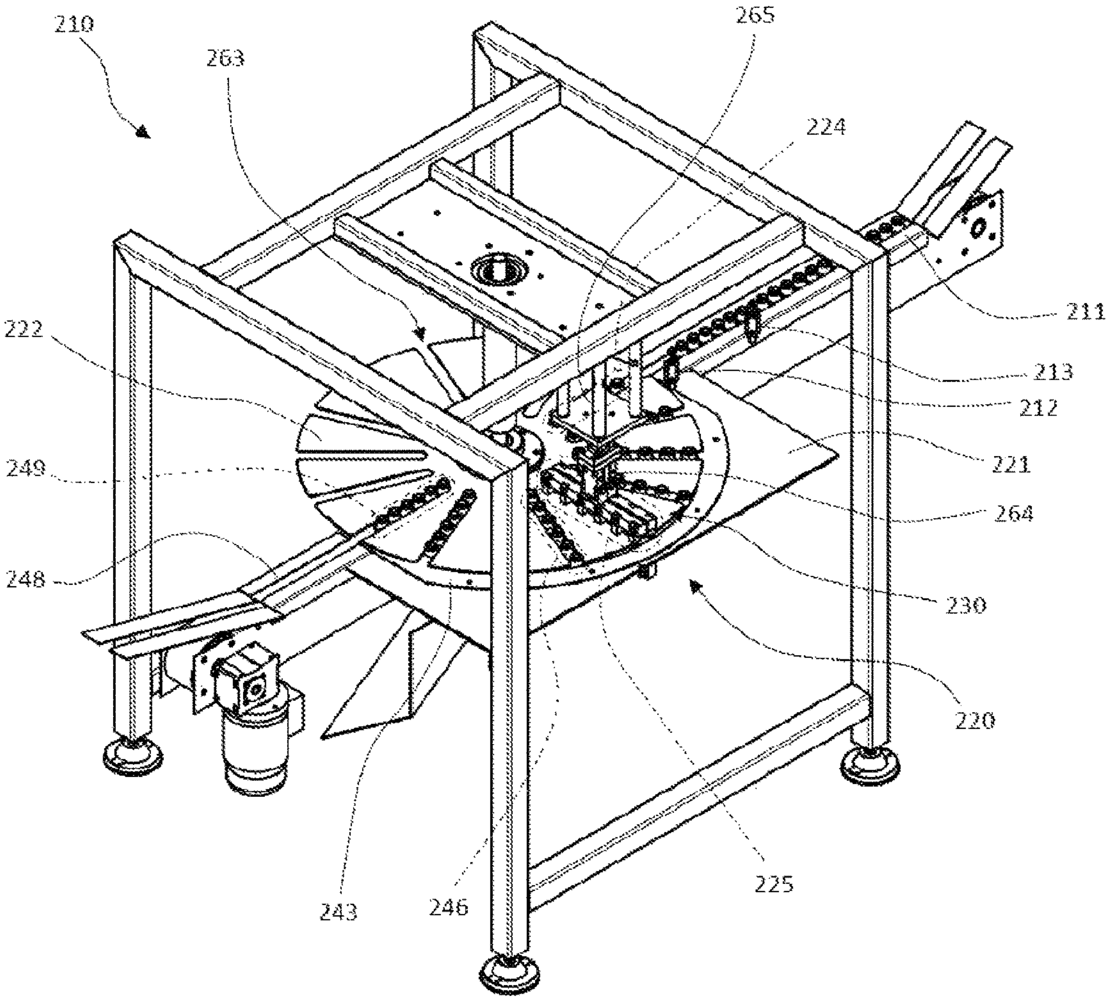

[Fig. 13]
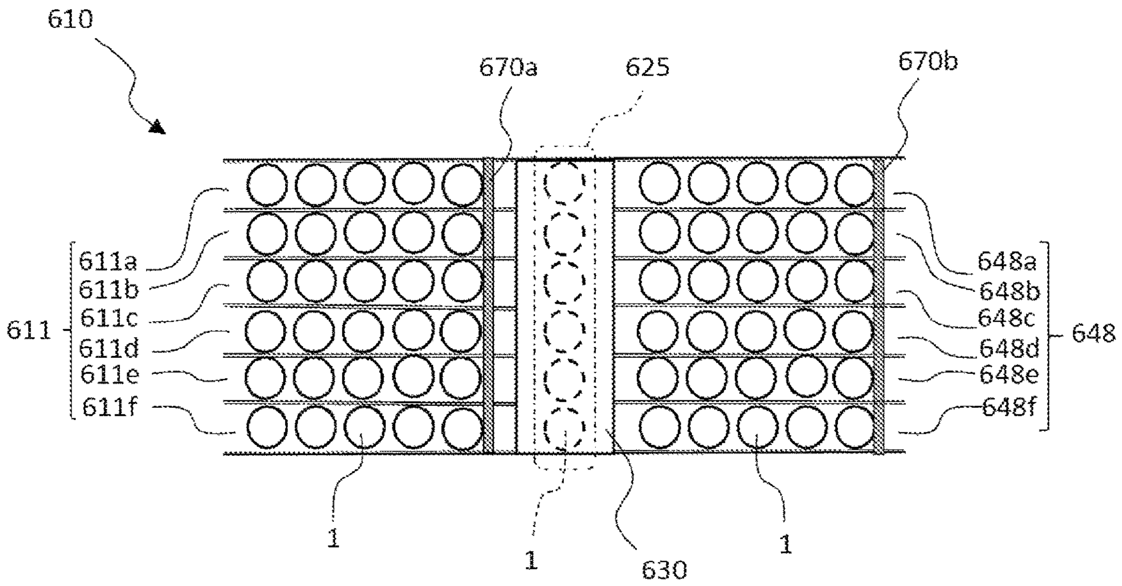
[Fig. 14]
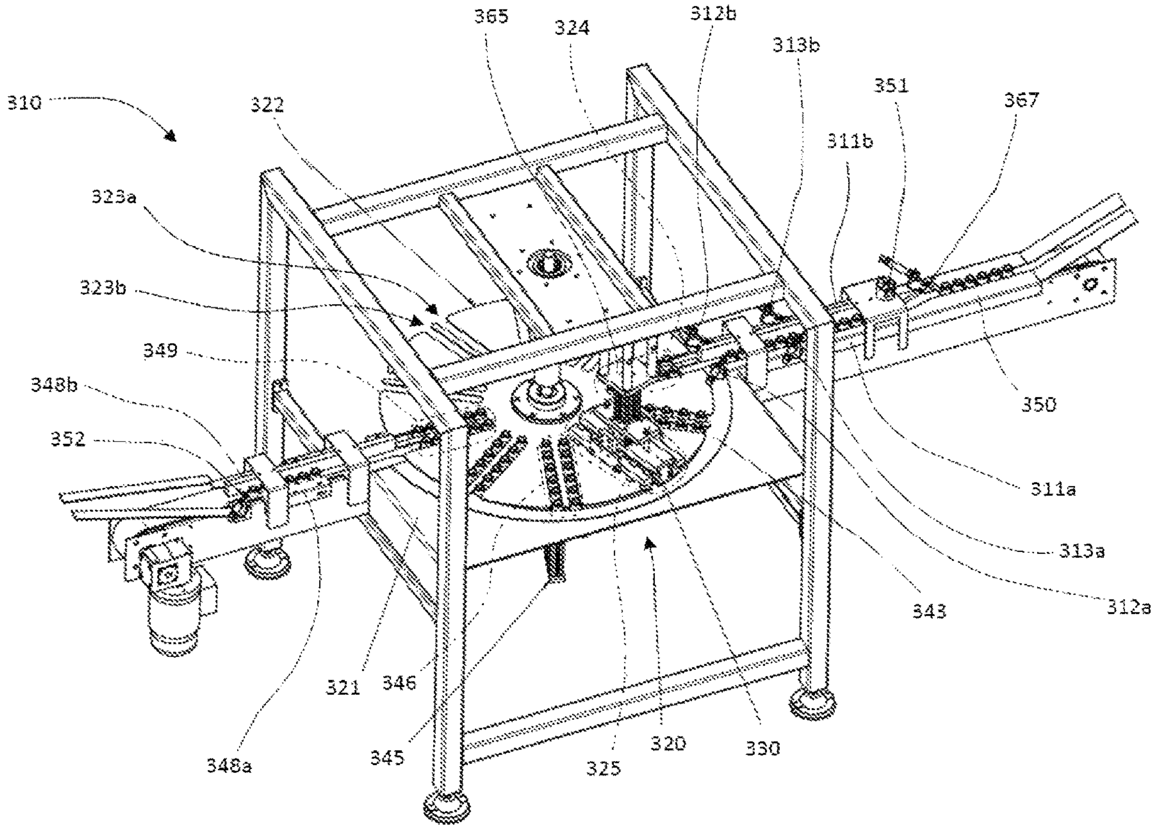

[Fig. 19]
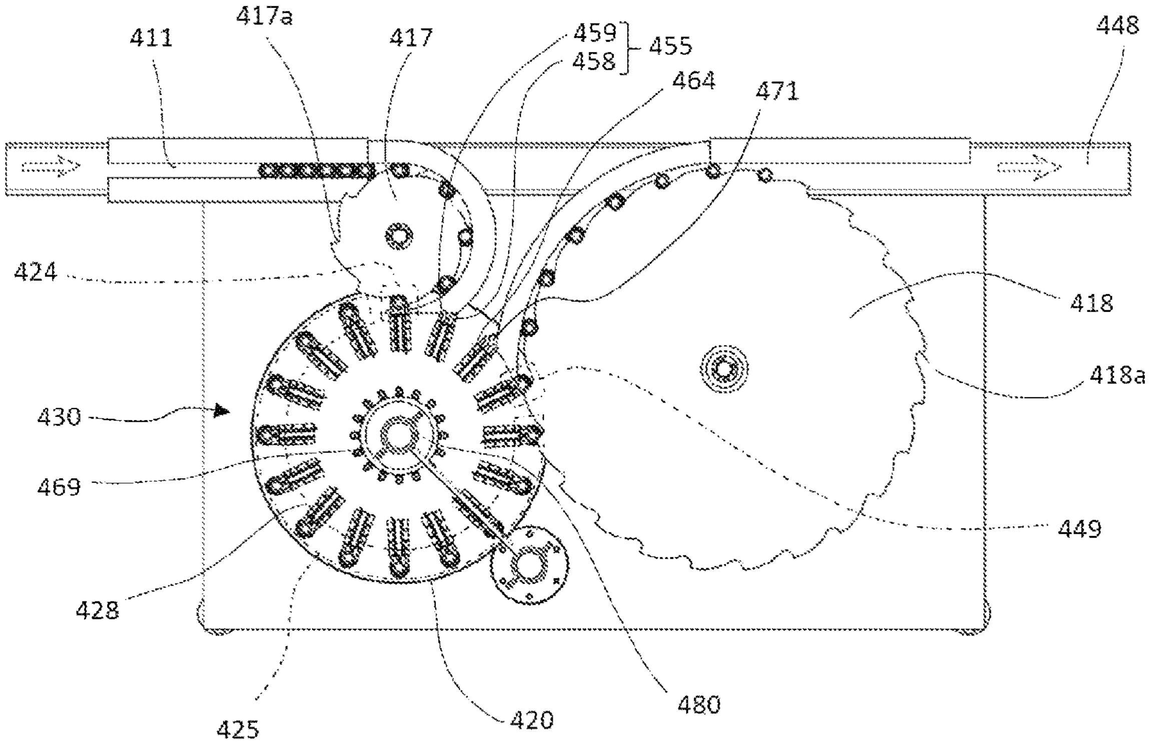
[Fig. 20]
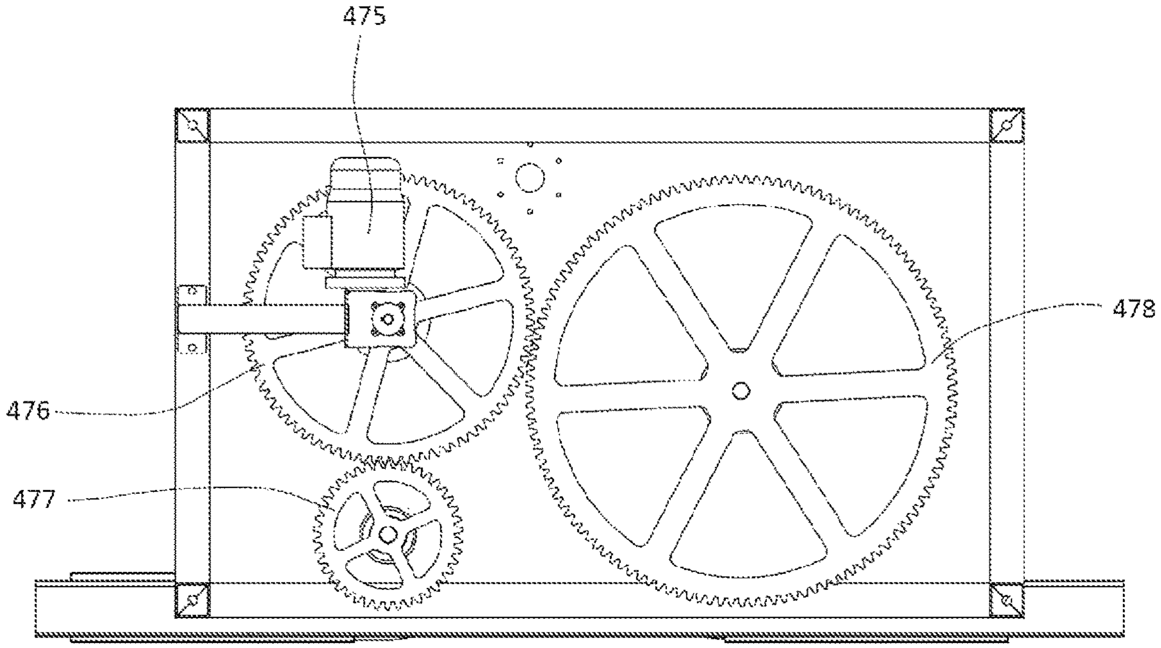

[Fig. 21]
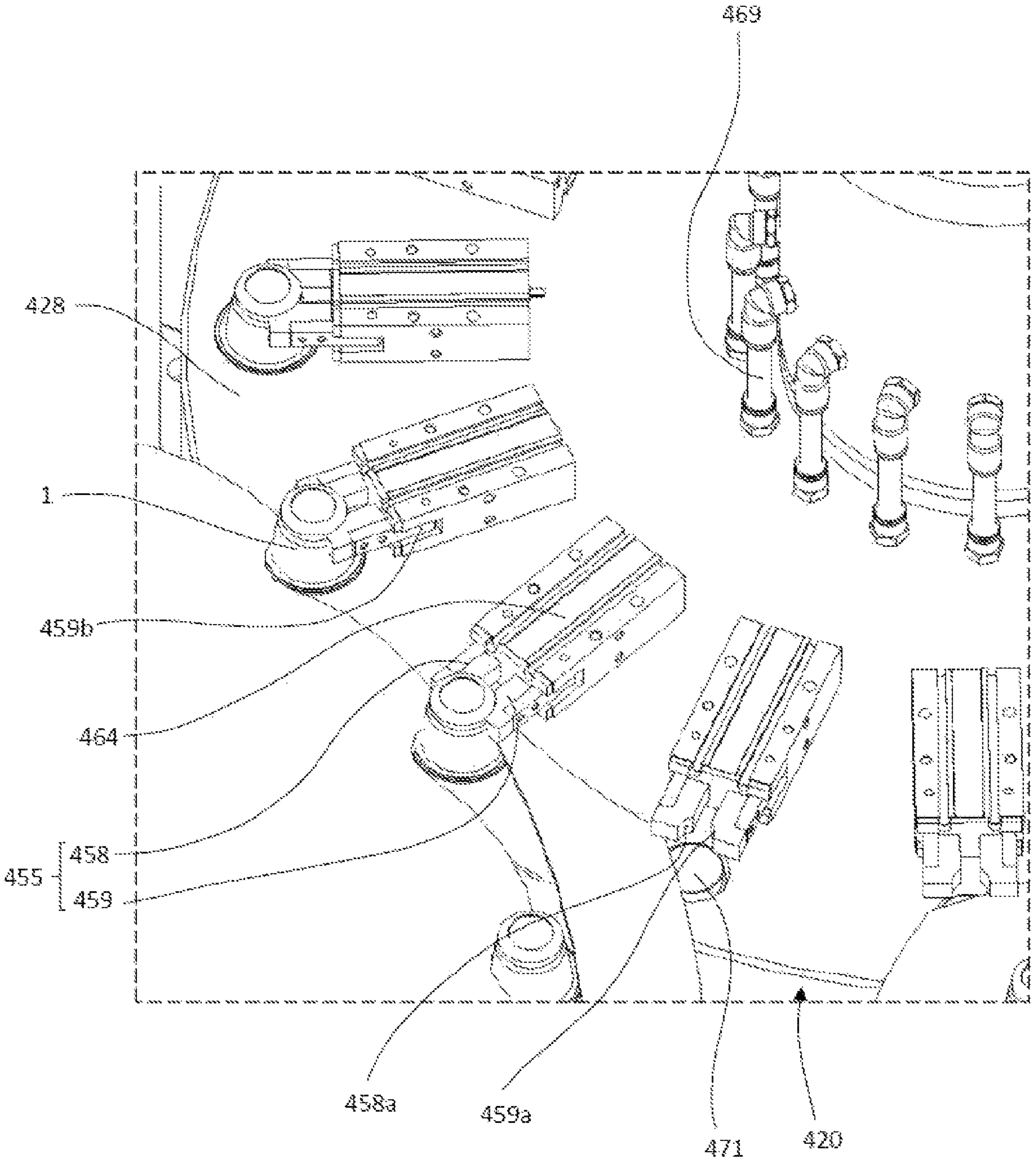

SYSTEM FOR DETECTING LEAKED GAS FROM CONTAINERS

TECHNICAL FIELD

The present invention relates to a system for detecting leaks from containers, in particular containers containing foods, for example, coffee capsules.

More particularly, the invention relates to an in-line system, i.e. a system configured to operate along a line for packaging such containers.

BACKGROUND ART

Systems and methods for detecting leaks from food containers, for example, coffee capsules, are known. A generic coffee capsule, shown in FIG. 1, comprises a semi-rigid shell 2 having an opening, usually a circular opening, delimited by a rim 3, and a lid 4, usually a flexible lid, attached to the rim 3, typically by means of adhesives and/or hot welding.

The known systems for detecting leaks from coffee capsules are usually based on the detection, by means of visual or tactile sensors, of shifts or deformations of the lid of the capsule. For example, document US2016349138A1 discloses a system in which a vacuum is created around the coffee capsule. If the lid is not perfectly glued to the rim of the shell, the lid tends to lift. A sensor detects the contact with the lid portions that have lifted, thus revealing the presence of a leak and the position thereof.

Another known system is disclosed in document US2020264069A1. In said system the coffee capsules are compressed. The system then detects whether the lid of the capsule is deformed because of the compression. The non-deformation of the lid indicates the presence of leaks.

The known systems have the drawback that they are not very reliable. For example. In case of leaks of very small magnitude, in the system according to document US2016349138A1 the lid may not lift enough to be detected by the sensor, whereby a capsule with leaks might be considered as being intact. In the system according to document US2020264069A1, instead, in the presence of a small leak, the lid might lift anyway following compression of the shell and, again, a capsule with leaks might be considered as being intact.

The object of the present invention is to provide a system for detecting leaks from containers, for example, coffee capsules, which overcomes the limitations of the known systems.

A further object of the present invention is to provide an in-line system for detecting leaks, i.e. a system configured for operating along a line for packaging containers.

These and other objects are achieved with the system for detecting leaks from containers as claimed in the appended claims.

SUMMARY OF INVENTION

A system according to the invention for detecting leaks from containers comprises conveying means, comprising at least one inlet conveyor belt, said means being configured to transport containers, already filled with a given food and sealed, to an inspection zone, and an inspection apparatus, configured to test the tightness of containers arrived at the inspection zone.

The inspection apparatus comprises extraction means and suction means, configured to induce the release of volatile substances from each container arrived at the inspection zone and suck in gas surrounding each of said containers and any volatile substances leaked from said containers, and detection means, configured to analyze the sucked-in gas and detect the presence of any volatile substances leaked from said containers.

According to the invention, the detection means comprise sensors for volatile organic compounds (VOC). Indeed, it is known that the aroma of some foods contains volatile organic compounds. For example, coffee aroma contains hydrocarbons such as toluene or benzene, tea aroma contains hydrocarbons and ethanol (ethyl alcohol) and cocoa aroma contains ethanol. The system according to the invention therefore exploits the detection of such compounds for identifying containers having leaks.

According to an aspect of the invention, the extraction means of the system comprise one or more plungers, movably mounted in respective seats. Said plungers are configured to move from a raised position, in which an upper surface of the plungers is adapted to receive a container from the conveying means, and a lowered position, in which the container is carried into the seat of the plunger. The inspection apparatus further comprises a horizontal cover, configured to close said seats when the containers are within the seats, whereby each container is enclosed within a respective chamber defined by the upper surface of the respective plunger, the respective seat, and the cover. In addition, a channel is formed within each plunger; each channel has an end open towards the upper surface of the respective plunger and is connected to the suction means, configured to suck in gas from the seat associated with the respective plunger, through the channel and the open end thereof. Actuation of the suction means brings about formation of a vacuum within each chamber, which vacuum facilitates the diffusion of gas from the inside of the container towards the chamber, if the container has leaks. Furthermore, each channel is connected, preferably, to the detection means. Preferably, each channel is further connected to blowing devices, adapted to introduce gas into said seats through the channels of the respective plungers and the open ends thereof, in order to clean the sensors and the inspection zone after inspection of each container.

According to a further aspect of the invention, the extraction means of the inspection apparatus of the system comprise one or more grippers and respective ducts; each gripper comprises two jaws, configured to be moved from an open position to a closed compression position, in which they compress a respective container arranged between the jaws, in the inspection zone. Such compression facilitates the exit of gas from the inside of the containers towards the outside, if the container has leaks. Each duct is open towards the inspection zone and is connected to the suction means, which are configured to suck in gas surrounding the containers compressed by the grippers through the respective ducts and the open ends thereof. Furthermore, each duct is also connected, preferably, to the detection means. Preferably, said ducts are further connected to blowing devices, adapted to introduce gas into the inspection zone, through the duct and the open ends thereof, in order to clean the sensors and the inspection zone after the inspection of each container.

Preferably, the conveying means of the system for detecting leaks further comprise a star conveyor, configured to receive the containers arriving from the at least one inlet conveyor belt. The star conveyor comprises a fixed slider plate, on which the containers received from the at least one inlet conveyor belt rest, and a rotating disk. The rotating disk comprises a plurality of radial compartments, each configured to receive, in an entry zone of the star conveyor, a group of containers arriving from the at least one inlet conveyor belt, and for moving said group of containers, by means of the rotation of the rotating disk, dragging and sliding the containers on the fixed slider plate so that they reach the inspection zone.

Preferably, along the at least one inlet conveyor belt, means for dividing the incoming containers into groups of containers are provided, said groups comprising a predetermined number of containers.

Preferably, the star conveyor comprises spacer guides, arranged between the rotating disk and the slider plate and configured to create a radial spacing between the containers of a same group so that said containers arrive at the inspection zone properly spaced from one another.

BRIEF DESCRIPTION OF DRAWINGS

These and other features and advantages of the present invention will become more evident from the following description of preferred embodiments given by way of non-limiting examples with reference to the annexed figures, in which elements denoted by same or similar reference numerals indicate elements having same or similar function and construction, and in which:

FIG. 1 shows a perspective view of a common coffee capsule;

FIG. 2 is a perspective view of a system for detecting leaks from coffee capsules according to an embodiment of the present invention;

FIG. 3 is a perspective view of a portion of the system of FIG. 2;

FIG. 4 is a top view of the system of FIG. 2;

FIG. 5 is a top view of a portion of a system for detecting leaks from coffee capsules according to a further embodiment of the present invention;

FIG. 8*b* is a sectional view of the inspection apparatus of FIG. 6 in a second step of the operation thereof;

FIG. 8*c* is a sectional view of the inspection apparatus of FIG. 6 in a third step of the operation thereof;

FIG. 8*d* is a sectional view of the inspection apparatus of FIG. 6 in a fourth step of the operation thereof;

FIG. 9 is a top view of a star conveyor of a system according to the present invention, shown by omitting the rotating disk;

FIG. 10 is a top view of a system for detecting leaks from coffee capsules according to a further embodiment of the present invention;

FIG. 11 is a perspective view of a system for detecting leaks from coffee capsules according to a further embodiment of the present invention;

FIG. 13 is a top view of a system for detecting leaks from coffee capsules according to a further embodiment of the present invention;

FIG. 14 is a perspective view of a system for detecting leaks from coffee capsules according to a further embodiment of the present invention;

FIG. 19 is a top view of the system of FIG. 18;

FIG. 20 is a bottom view of the system of FIG. 18, in which the transmission mechanism can be seen;

FIG. 21 is a perspective view of a portion of the system of FIG. 18.

DESCRIPTION OF EMBODIMENTS

Figure 6:
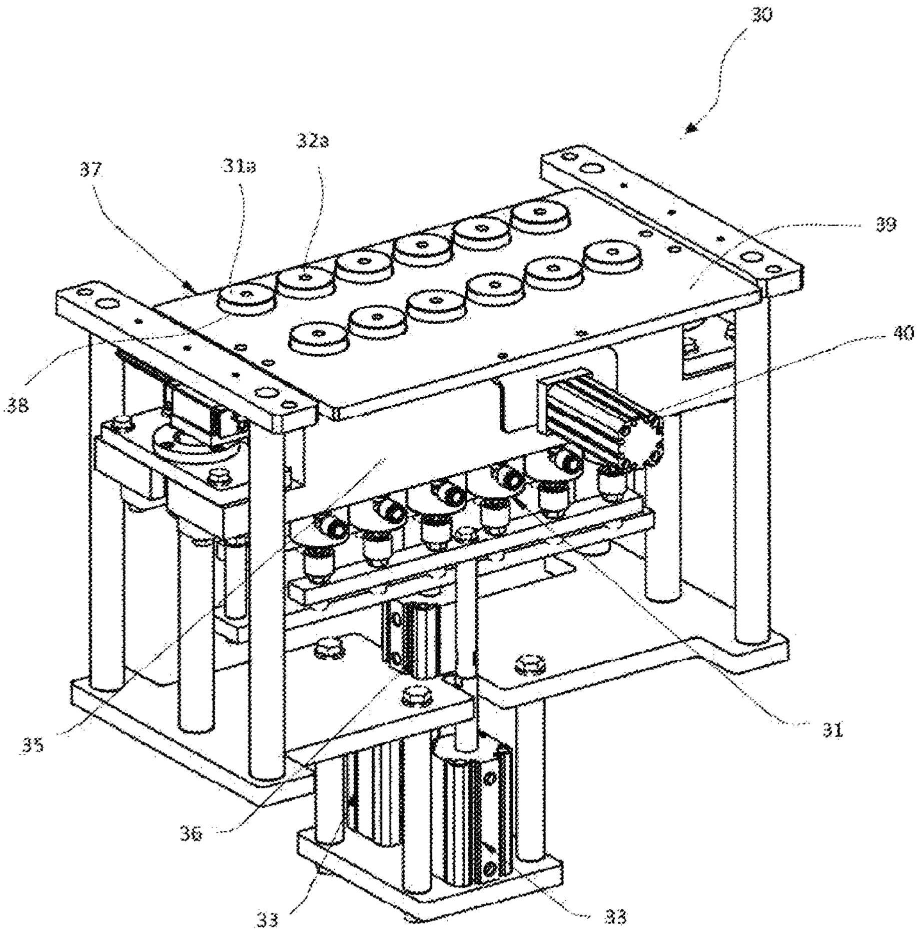
FIG. 6 is a perspective view of an inspection apparatus of the system of FIG. 2.
Figure 7:
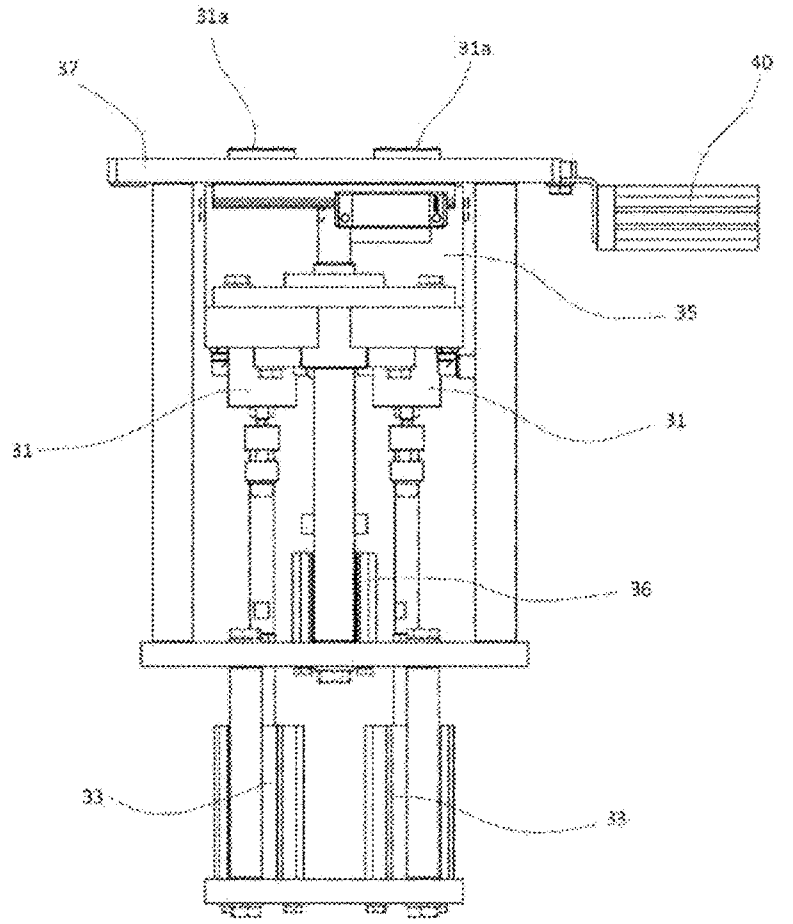
FIG. 7 is a side view of the inspection apparatus of FIG. 6.

Different embodiments of a system for detecting leaks from containers are described below. In particular, and by way of non-limiting example, the containers shown in the following embodiments are coffee capsules.

By way of illustration, FIG. 1 shows a common coffee capsule 1, comprising a semi-rigid shell 2 having an opening, usually a circular opening, delimited by a rim 3, and a lid 4, usually a flexible lid, attached to the rim 3, typically by means of adhesives and/or hot welding.

Referring to FIGS. 2, 3 e 4, a system for detecting leaks from coffee capsules according to a first embodiment of the present invention is indicated by reference numeral 10.

The system 10 is, advantageously, an in-line system, i.e. a system configured, as will illustrated below, to operate along a line for packaging coffee capsule. In particular, the system 10 is arranged downstream of a capsuling machine (not shown) of the packaging line. Such capsuling machine (which is not part of the subject matter of the invention), in a known manner, after filling the shells 2 of the capsules 1 with coffee powder, seals them by applying the lids 4. In particular, in a typical capsuling machine of the known type, the capsules move forward divided in columns, at a constant pace. The single operations—filling the shell 2 of the capsule 1 with the coffee powder, positioning the lid 4 on the rim 3 of the shell 2 and scaling—take place in a sequence and each of said operations is carried out simultaneously on a group of capsules 1 comprising a capsule for each column, in a short time span (cycle time), in the order of one second. In order to increase productivity, the number of column in increased, while maintaining constant the cycle time of each operation. Current capsuling machines usually operate with 6, 8 or 10 columns.

The system 10 according to the present embodiment of the invention comprises a pair of inlet conveyor belts 11*a*, 11*b*, for conveying the sealed capsules arriving from said capsuling machine of the packaging line into the system 10, a star conveyor 20, configured to receive the capsules 1 transported by the inlet conveyor belts 11*a*, 11*b*, and an inspection apparatus 30, associated with the star conveyor 20 and configured to test the tightness of the capsules 1 (already filled with coffee and sealed) transported by said star conveyor 20. In an alternative embodiment, shown in FIG. 5, the system may comprise a single inlet conveyor belt 111.

Still referring to FIGS. 2, 3 and 4, the system 10 further comprises, preferably, one or more discarding stations 45, also associated with the star conveyor 20 and arranged downstream of the inspection apparatus 30, said discarding stations being configured to discard those capsules having leaks, and a pair of outlet conveyor belts 48*a*, 48*b*, for re-introducing the capsules that have not been discarded, i.e. the capsules without leaks, into the packaging line. The outlet conveyor belts 48*a*, 48*b* can be a continuation of the inlet conveyor belts 11*a*, 11*b* (as shown in FIGS. 2 e 3) or separate belts. In alternative embodiments (not shown), the discarding station can be arranged downstream of the star conveyor, along the outlet conveyor belts.

The capsules are preferably moved, both on the conveyor belts 11*a*. 11*b*, 48*a*, 48*b* and on the star conveyor 20, while resting on their respective lids 4.

Referring in particular to FIG. 4, along the inlet conveyor belts 11*a*. 11*b* of the system 10 there are provided, preferably, means for dividing the incoming capsules into groups G of capsules having a predetermined number of capsules. Said means comprise, for example, for each belt, a pair of stoppers 12*a*, 13*a*, 12*b*, 13*b*, appropriately spaced from one another and configured to stop and allow, alternately, the passage of the capsules 1 on the respective inlet conveyor belt 11*a*, 11*b*. The stoppers 12*a*, 13*a*, 12*b*, 13*b* comprise, for example, a tip 14, preferably made of a plastic material, mounted on the shaft 15 of a pneumatic cylinder 16 or other known actuator, so as to be inclined in a direction opposite to the forward direction of the capsules 1. The first stopper 12*a*, 13*a* of each pair, arranged at a more downstream position, is configured to stop the first capsule 1' of a group G of capsules to be introduced into the star conveyor 20, whereas the second stopper 12*b*, 13*b* of each pair, arranged at a more upstream position, stops the first capsule 1" of the following group.

Preferably, upstream of the two inlet conveyor belts 11*a*, 11*b* there is provided a single main inlet conveyor belt 50, along which a pair of stoppers 67, 68 (or, alternatively, a single stopper) and a two-way diverter 51, of known type, are arranged, in order to divert the capsules alternately onto the two inlet conveyor belts 11*a*, 11*b*. In addition, downstream of the two outlet conveyor belts 48*a*, 48*b* there is provided a single main outlet conveyor belt 53 to which the groups of capsules present on the two outlet conveyor belts 48*a*, 48*b* are conveyed.

The star conveyor 29 comprises, preferably, a fixed slider plate 21, on which the capsules received from the inlet conveyor belts 11*a*, 11*b* rest, and a rotating disk 22, arranged above the slider plate 21 and substantially parallel thereto, said rotating disk comprising a plurality of pairs of radial compartments (or sectors) 23*a*, 23*b* configured to receive, in an entry zone 24 of the star conveyor 20, the capsules arriving from the two inlet conveyor belts 11*a*, 11*b*, and to move said capsules, by means of the rotation of the rotating disk 22, dragging and sliding them on the slider plate 21 so that they reach an inspection zone 25 of the star conveyor 20, in which the inspection apparatus 30 is arranged, a following discarding zone 46, in which a discarding station 45 is arranged, and finally an outlet zone 49 of the star conveyor 20, in which those capsules that have not been discarded are introduced onto the outlet conveyor belts 48*a*, 48*b*. Preferably, means for dividing the exiting capsules into groups of capsules, for example, a stopper 52 like those described for the inlet conveyor belts 11*a*, 11*b*, are provided also along one of the outlet conveyor belts 48*a*, 48*b*. This stopper 52 is actuated to stop a group of exiting capsules on the outlet conveyor 48*a* and allow the other group of capsules present on the outlet conveyor belt 48*b* to be conveyed onto the main outlet conveyor belt 53.

According to the alternative embodiment in which the system comprises a single inlet conveyor belt 111, a single pair of stoppers 112, 113 is provided, and the rotating disk 122 of the star conveyor 120 comprises a plurality of single radial compartments (or sectors) 123, for receiving the capsules arriving from said single inlet conveyor belt 111, as is shown in FIG. 5.

According to the invention, the rotating disk 22 (or 122) of the star conveyor 20 (or 120) has an intermittent rotation, with discrete steps, synchronized with the above-mentioned means 12*a*, 13*a*, 12*b*, 13*b* (or 112, 113) for dividing the incoming capsules into groups G so that each group G of capsules arriving from the inlet conveyor belts 11*a*. 11*b* (or from the inlet conveyor belt 111) is introduced, at the entry zone 24 (or 124), into a respective sector 23*a*, 23*b* (or 123) of the rotating disk 20 (or 120). In addition, at each step of the rotating disk 20 (or 120), besides introducing two groups (or one group) G of capsules into the entry zone 24 (or 124) of the star conveyor 20 (or 120), two groups (or one group) G of capsules are also released from the outlet zone 49 (or 149) of the star conveyor 20 (or 120) towards the outlet conveyor belts 48*a*, 48*b* (or towards the single outlet conveyor belt 148), less the discarded capsules.

Advantageously, the groups of capsules formed on the inlet conveyor belts 11*a*, 11*b* (or on the inlet conveyor belt 111) and introduced in the sectors 23*a*, 23*b* (or 123) of the rotating disk 22 (or 122) preferably comprise a number of capsules equal to the number of columns on which the capsuling machine arranged upstream of the system 10 operates.

According to the invention, on the slider plate 21 of the star conveyor 20 (or 120) a plurality of openings 26 (visible in FIGS. 8*a-d*) are provided, arranged radially aligned along two columns—or in a single column, in the embodiment of the system with a single inlet conveyor belt—so that each capsule of a group G dragged by the rotating disk 22 (or 122) comes to lie, in the inspection zone 25, at a corresponding opening 26. Each opening 26 has a diameter such that the respective capsule can pass therethrough.

The inspection apparatus 30, as mentioned above, is configured to test the tightness of the capsules 1, for example, though not exclusively, at the sealing region between the lid 4 and the rim 3 of the shell 2 of the capsules 1. This apparatus 30 comprises extraction means and suction means, configured to induce the release of volatile substances from each capsule received and suck in gas surrounding each capsule received, and thus any volatile substances leaked from said capsule, and detection means, configured to analyze the sucked-in gas and detect the presence of any volatile substances leaked from each capsule received.

Referring to FIGS. 6, 7 and 8*a-d*, the extraction means and suction means of the inspection apparatus comprise a plurality of plungers 31, divided into two parallel columns, each column comprising a number of plungers 31 equal to (or larger than) the number of capsules in each group G of capsules formed on the inlet conveyor belts 11*a*, 11*b* (or on the inlet conveyor belt 111). In the embodiment of the system with a single inlet conveyor belt, the extraction means and suction means comprise a single column of plungers 31.

The plungers 31 are movably mounted in respective seats 34 so as to be able to translate vertically. Said seats 34 are preferably provided in a single body 35, which is arranged below the slider plate 21 of the star conveyor 20 (or 120) and is also mounted vertically movable. The plungers 31 of a column are moved preferably by means of a single actuator, for example, a first pneumatic cylinder 33, from a raised position, in which a substantially horizontal upper surface 31*a* of the plungers 31 lies flush with the slider plate 21 of the star conveyor 20 (or 120), to a lowered position. The body 35 is moved by an actuator independent of the one of the plungers, for example, a second pneumatic cylinder 36, from a lowered position to a raised position.

Each of said seats 34 of the body 35 (and thus the corresponding plungers 31 arranged therein) is located coaxially with one of the openings 26 of the slider plate 21. In addition, the plungers 31 have a diameter allowing them to be introduced into the openings 26 of the slider plate 21.

A channel 32 is formed inside each plunger 31. Each channel 32 has an end 32*a* open towards the upper surface 31*a* of the respective plunger 31 and is connected to the suction means (not shown), adapted to suck in gas from the respective seat 34 of the body 35 through the channel 32 and the open end thereof 32*a*.

The inspection apparatus 30 further comprises a horizontal cover 37, arranged below the slider plate 21 of the star conveyor 20 (or 120), between said slider plate and the body 35. This cover 37 comprises a plurality of openings 38, one for each plunger 31, having a diameter allowing passage of the respective plungers 31 and the capsules 1 therethrough. The cover 37 is mounted horizontally movable and is moved by an actuator, for example, a third pneumatic cylinder 40, so as to be able to move from a first position, in which the openings 38 coincide axially with the openings 26 of the slider plate 21 and with the plungers 31, to a second position, in which a continuous portion 39 of the cover 37 interposes completely between the openings 26 of the slider plate 21 and the seats 34 of the body 35.

In addition, each channel 32 is connected to detection means (not shown). The detection means are sensors, of known type, for volatile organic compounds (VOC), including hydrocarbons such as toluene and benzene, and each channel 32 is connected to a respective sensor thereof or to a plurality of respective sensors thereof sensitive to distinct volatile compounds.

Referring to FIGS. 8*a-d*, the operation steps of the inspection apparatus 30 are illustrated below.

Figure 8A:
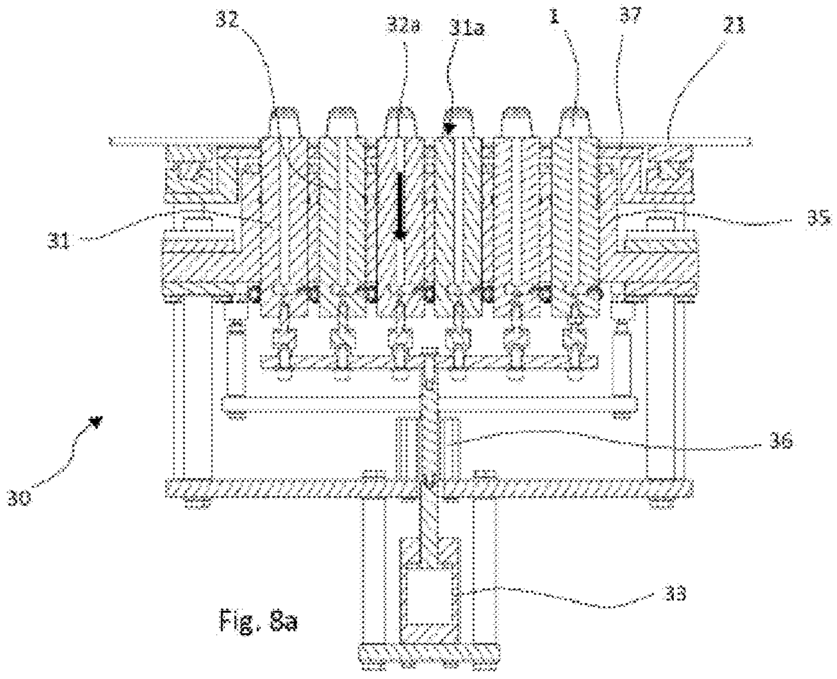
FIG. 8*a* is a sectional view of the inspection apparatus of FIG. 6 in a first step of the operation thereof.

In a first step, shown in FIG. 8*a*, the plungers 31 are located at their raised position, in which their upper surfaces 31*a* lie flush with the slider plate 21 of the star conveyor 20 (or 120). A group G of capsules, dragged by the rotating disk 22 (or 122), has been brought to the inspection zone 25 so that the capsules are on the respective plungers 31. In this step, the suction means are preferably activated, so as to create, in each channel 32 of the plungers 31, a vacuum holding the capsules in their respective positions (see the arrow shown in FIG. 8*a* and exemplifying the flow direction).

In the embodiment of the system with a single inlet conveyor belt and a single column of plungers 31, the capsules reach the inspection zone one group at a time, whereas, in the embodiment of the system 10 with two inlet conveyor belts 11*a*. 11*b* and two columns of plungers 31, the capsules reach the inspection zone 25 two groups at a time.

In a second step, shown in FIG. 8*b*, while preferably maintaining the suction means activated, the plungers 31 lower to their lowered position and carry with them the capsules, which thus pass through the openings 26 and 38 of the slider plate 21 and the cover 37, respectively. The lowered position of the plungers 31 is such that the capsules present on the plunger are completely below the over 37.

In a third step, shown in FIG. 8*c*, the cover 37 translates horizontally from its first position until it reaches its second position, in which a continuous portion 39 of the cover 37 interposes completely between the openings 26 of the slider plate 21 and the seats 34 of the body 35. Preferably, the suctions means, which have been kept activated so far, are deactivated and blowing devices are activated in order to introduce, into each seat 34 of the body 35, a gas jet in order to remove any residues left by preceding capsules with leaks and clean the detection means (see the arrow shown in FIG. 8*c* and exemplifying the flow direction).

In a fourth step, shown in FIG. 8*d*, the body 35 translates vertically upwards, from its lowered position to its raised position, in which said body is in abutment against the lower surface 39*a* of the continuous portion 39 of the cover 37, whereby each capsule is enclosed in a respective chamber 41 defined by the upper surface 31*a* of the respective plunger 31, the side wall 34*a* of the respective seat 34, and the continuous portion 39 of the cover 37. In this step, a vacuum is created inside each chamber 41 by means of the suction means, so that a pressure difference is created between the inside of each capsule and the chamber in which said capsule is arranged (see the arrow shown in FIG. 8*d* and exemplifying the flow direction); this pressure difference facilitates the diffusion of gas from the inside of the capsule towards the chamber 41, if the capsule has leaks.

The above-mentioned operations carried out by the inspection apparatus 30 are advantageously carried out simultaneously on all the capsules of each group G of capsules that reaches the inspection zone 25.

Subsequently, the gas present in each chamber 41 is sucked in and guided to the detection means for detecting the presence of volatile organic compounds, especially hydrocarbons such as toluene and benzene. The system then associates the detection of such compounds in a chamber 41 with the respective capsule contained in said chamber, in order for said defective capsule to be discarded in the following discarding station 45. According to the invention, the discarding station 45 is also configured to operate simultaneously on all the capsules of each group G of capsules that reaches the discarding zone 46.

Preferably, the star conveyor 20 (or 120) comprises spacer guides 43, as shown in FIG. 9. These guides 43 are arranged between the rotating disk 22 (or 122) and the slider plate 21 and cover the entire arc of travel of the capsules from the entry zone 24 (or 124) to the outlet zone 49 (or 149). These guides 43 are configured to create a radial spacing between the capsules of a same group G so that said capsules arrive at the inspection zone 25 properly spaced from one another. Advantageously, this makes it possible to prevent false leak detections caused by the fact that intact capsules have become contaminated with volatile compounds of near capsules with leaks. Preferably, once the maximum distance between the capsules has been obtained at the inspection zone 25 (or 125), the guides 43 cause the capsules to move again closer to one another during their travel towards the outlet zone 49 (or 149).

In the embodiments described above, thanks to the fact that the groups G of capsules formed on the inlet conveyor belts 11*a*, 11*b* (or on the inlet conveyor belt 111) and introduced in the sectors 23*a*, 23*b* (or 123) of the rotating disk 22 (or 122) comprise a number of capsules equal to the number of columns on which the capsuling machine arranged upstream of the system 10 operates, and thanks to the fact that the inspection apparatus 30 simultaneously tests the tightness of all the capsules of a group G of capsules that has arrived at the inspection zone 25, the system 10 for detecting leaks advantageously operates with the same production regime of the capsuling machine arranged upstream of the system. In addition, it is advantageously possible to act on the number of capsules of the groups G (within certain limits) in order to increase the production capacity of the system, while maintaining a constant cycle time (corresponding to the time interval between a step of the star conveyor 20 or 120 and the subsequent step).

Referring to FIG. 10, a system for detecting leaks from coffee capsules according to a further embodiment of the present invention is indicated by reference numeral 510.

Similarly to the embodiments described above, the system 510 is also an in-line system operating along a line for packaging coffee capsules and is arranged downstream of a capsuling machine, of known type, similar to the previously illustrated one.

According to the present embodiment of the invention, the system 510 comprises an inlet conveyor belt 511 having a plurality of lanes 511*a-f*, in a number equal to the number of columns on which the capsuling machine arranged upstream operates, an inspection apparatus 530 arranged in an inspection zone 525 located downstream of the inlet conveyor belt 511, and an outlet conveyor belt 548 arranged downstream of the inspection zone 525 and having a plurality of lanes 548*a-f*.

Preferably, upstream of the inspection zone 525 there is provided a gate 570*a* configured to stop and allow, alternately, the forward movement of the capsules 1 on the respective lanes 511*a-f* of the inlet conveyor belt 511. The gate 570*a* is closed to allow the inspection apparatus to inspect the capsules present in the inspection zone 525 and opened again to allow further capsules to reach the inspection zone when the former inspection is completed. Preferably, there is further provided an additional gate 570*b* along the outlet conveyor belt 548. Alternatively, the two inlet 511 and outlet 548 conveyor belts are actuated intermittently and synchronously with the inspection apparatus 530, stopping during an inspection in the inspection apparatus 530 and moving forward when the inspection is completed, to introduce new capsules into the inspection zone 525.

The forward movement of the capsules 1 from the inlet conveyor belt to the inspection zone and then to the outlet conveyor belt 548 can be guaranteed in several manners. For example, the two inlet 511 and outlet 548 conveyor belts as well as the inspection apparatus 530 can be inclined, so that the capsules 1 slide by themselves. Alternatively, the capsules 1 can move forward by virtue of the thrust exerted by the preceding capsules. A further alternative provides for using suitable mechanical means (for example, augers) adapted to move the capsules 1 forward in a well-spaced and paced manner.

The inspection apparatus 530 of the detection system 510 is configured to test the tightness of the capsules 1 (already filled with coffee and scaled) and comprises extraction means and suction means, configured to induce the release of volatile substances from each capsule received and suck in gas surrounding each capsule received and thus any volatile substances leaked from said capsule, and detection means, configured to analyze the sucked-in gas and detect the presence of any volatile substances leaked from each capsule received.

The inspection apparatus 530 is similar to the inspection apparatus 30 of the previous embodiment, but, unlike said inspection apparatus 30, it comprises a single column of plungers, in a number equal to the number of lanes of the inlet conveyor belt 511. For a detailed description of the inspection apparatus 530, only shown schematically in FIG. 10, and the operation thereof, reference is therefore made to the description of the inspection apparatus 30 and corresponding FIGS. 6, 7, and 8*a-d*.

A variant, not shown, of the above-mentioned embodiment provides for a conveyor belt comprising a single lane and an inspection apparatus comprising a single plunger.

Referring to FIG. 11, a system for detecting leaks from coffee capsules according to a further embodiment of the present invention is indicated by reference numeral 210.

Similarly to the embodiments described above, the system 210 is also an in-line system operating along a line for packaging coffee capsules and is arranged downstream of a capsuling machine, of known type, similar to the previously illustrated one.

According to the present embodiment of the invention, the system 210 comprises an inlet conveyor belt 211, for conveying the sealed capsules arriving from said capsuling machine of the packaging line into the system, a star conveyor 220, configured to receive the capsules transported by the inlet conveyor belt 211, and an inspection apparatus 230, associated with the star conveyor 220 and configured to test the tightness of the capsules 1 (already filled with coffee and sealed) transported by said star conveyor 220.

The system 210 further comprises, preferably, a discarding station (not visible in FIG. 11), also associated with the star conveyor 220 and arranged downstream of the inspection apparatus 230, said discarding station being configured to discard the capsules with leaks, and an outlet conveyor belt 248, for re-introducing those capsules that have not been discarded, i.e. those without leaks, into the packaging line. The outlet conveyor belt 248 can be a continuation of the inlet conveyor belt 211 (as in FIG. 11) or a separate belt. In alternative embodiments (not shown), the discarding station can be arranged downstream of the star conveyor, along the outlet conveyor belt.

Some components of the system 210, including the inlet conveyor belt 211, the star conveyor 220, the discarding station and the outlet conveyor belt 248 are essentially the same as those present in the previous embodiment (system 10). In particular, the inlet conveyor belt 211 of the system 210 is also preferably provided with means, for example, a pair of stoppers 212, 213, for dividing the incoming capsules into groups G of capsules 1. The star conveyor 220 also comprises, as in the previous embodiment (system 10), a fixed slider plate 221, on which the capsules rest, and a rotating disk 222, with intermittent rotation, having a plurality of single radial compartments (or sectors) 223, for receiving, in an entry zone 224 of the star conveyor 220, the capsules arriving from the single inlet conveyor belt 211, and moving them, by means of the rotation of the rotating disk, so that they reach an inspection zone 225 of the star conveyor 220, in which the inspection apparatus 230 is arranged, a following discarding zone 246, in which the discarding station is arranged, and finally an outlet zone 249 of the star conveyor 220, in which those capsules that have not been discarded are introduced onto the outlet conveyor belts 248. In addition, the star conveyor 220 also comprises spacer guides 243, like those previously described with reference to FIG. 9, said spacer guides being arranged between the rotating disk 222 and the slider plate 221 and configured to create a radial spacing between the capsules of a same group G so that said capsules arrive at the inspection zone 225 properly spaced from one another, thus preventing false leak detections caused by the fact that intact capsules have become contaminated with volatile compounds of near capsules with leaks.

For a more detailed description of the above-mentioned components, reference is made to what has been illustrated in connection with the previous embodiments; the following description, instead, is mainly focused on the inspection apparatus 230 e the other parts different from the previous embodiments.

The inspection apparatus 230 is configured to test the tightness of the capsules 1, for example, though not exclusively, at the sealing region between the lid 4 and the rim 3 of the shell 2 of the capsules 1. This apparatus comprises extraction means and suction means, configured to induce the release of volatile substances from each capsule received and suck in gas surrounding each capsule received, and thus any volatile substances leaked from said capsule, and detection means, configured to analyze the sucked-in gas and detect the presence of any volatile substances leaked from each capsule received.

The extraction means of the inspection apparatus comprise a plurality of grippers 255, in a number equal to (or larger than) the number of capsules 1 of each group G of capsules formed on the inlet conveyor belt 211. The grippers 225 are arranged aligned in a single column, in a radial direction with respect to the star conveyor 220 with which the inspection apparatus 230 is associated. The grippers 255 are mounted on a supporting block 264, which in turn is mounted movably, in a vertical direction, on a fixed supporting structure 265. The supporting block 264 is moved by means of an actuator, for example, a pneumatic cylinder 266, from a raised position to a lowered position.

Referring to FIGS. 12*a-d*, each gripper 255 of the inspection apparatus 230 comprises two jaws 258, 259 having first ends 258*a*, 259*a* configured to exert a pressure against the shell 2 of the capsules 1, and second ends 258*b*, 259*b* hinged to the supporting block 264 so as to be able to perform a rotational movement about the respective hinge 260, 261, from an open position, in which the first ends 258*a*, 259*a* are distal to each other, to a gripping position, in which the first ends 258*a*, 259*a* are distanced from each other so as to be able to grip a capsule 1 located therebetween without compressing the shell 2 thereof, and a compression position, in which the first ends 258*a*, 259*a* are proximal to each other and compress the shell 2 of the coffee capsule 1 located therebetween. The jaws 258, 259 of the column of grippers 255 are moved by means of suitable actuators (not shown), preferably in a simultaneous manner.

According to the present embodiment, at the inspection zone 225, the slider plate 221 of the star conveyor 220 has a perforated portion 227, such as to allow the passage of air, as will be illustrated below, and simultaneously allow the capsules 1 to slide thereon without any obstacles.

According to the present embodiment, the inspection apparatus 230 comprises a plurality of ducts 269, arranged below the slider plate 221. Each of said ducts 269 has an end 269*a* open towards the perforated portion 227 of the slider plate 221 and vertically aligned to a corresponding gripper 255 of the extraction means. In addition, each of said ducts 269 is connected to suction means (not shown), configured to suck in gas from the inspection zone 225 through the duct 269, the open end 269*a* and the perforated portion 227, and, preferably, to blowing devices (not shown), adapted to introduce gas into the inspection zone 225, through the duct 269, the open end thereof 269*a* and the perforated portion 227.

In addition, each duct 269 is connected to the detection means (not shown). The detection means are sensors, of known type, for volatile organic compounds (VOC), including hydrocarbons such as toluene and benzene, and each duct 269 is connected to a respective sensor thereof or to a plurality of sensors thereof sensitive to distinct volatile compounds.

Still referring to FIGS. 12*a-d*, the steps of operation of the inspection apparatus 230 are illustrated below.

Figure 12B:
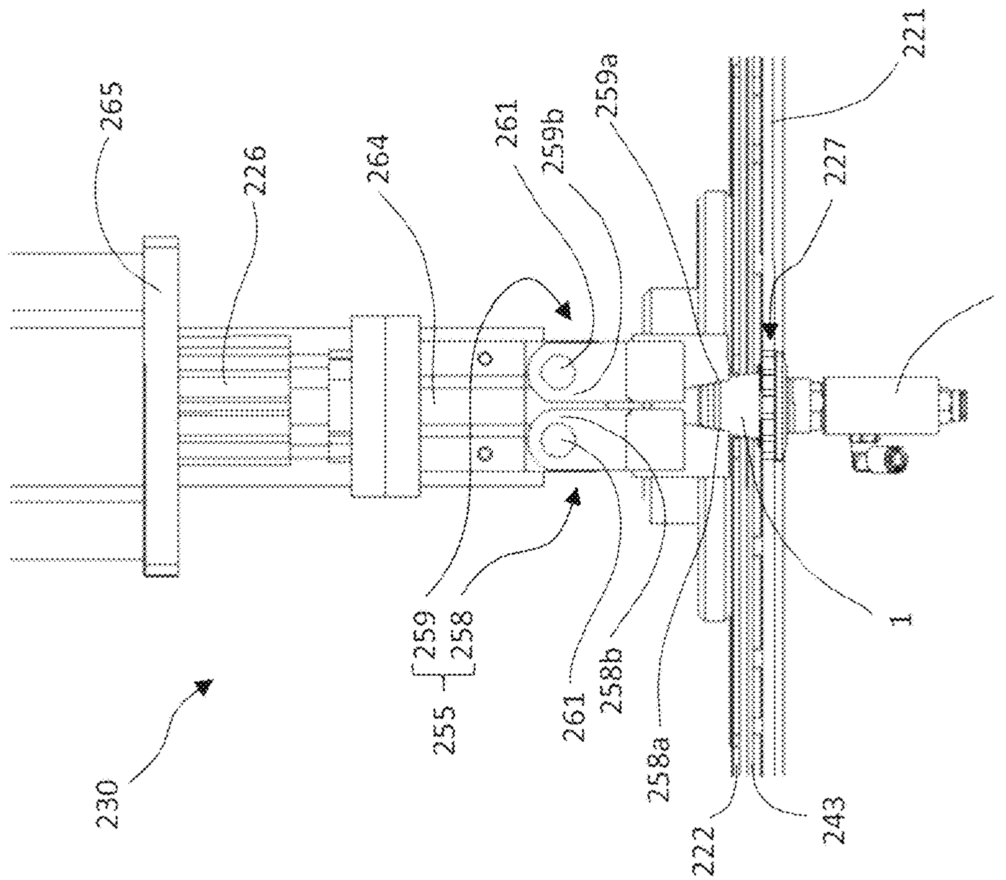
FIG. 12*b* is a front view of an inspection apparatus of the system of FIG. 11 in a second step of the operation thereof.
Figure 12A:
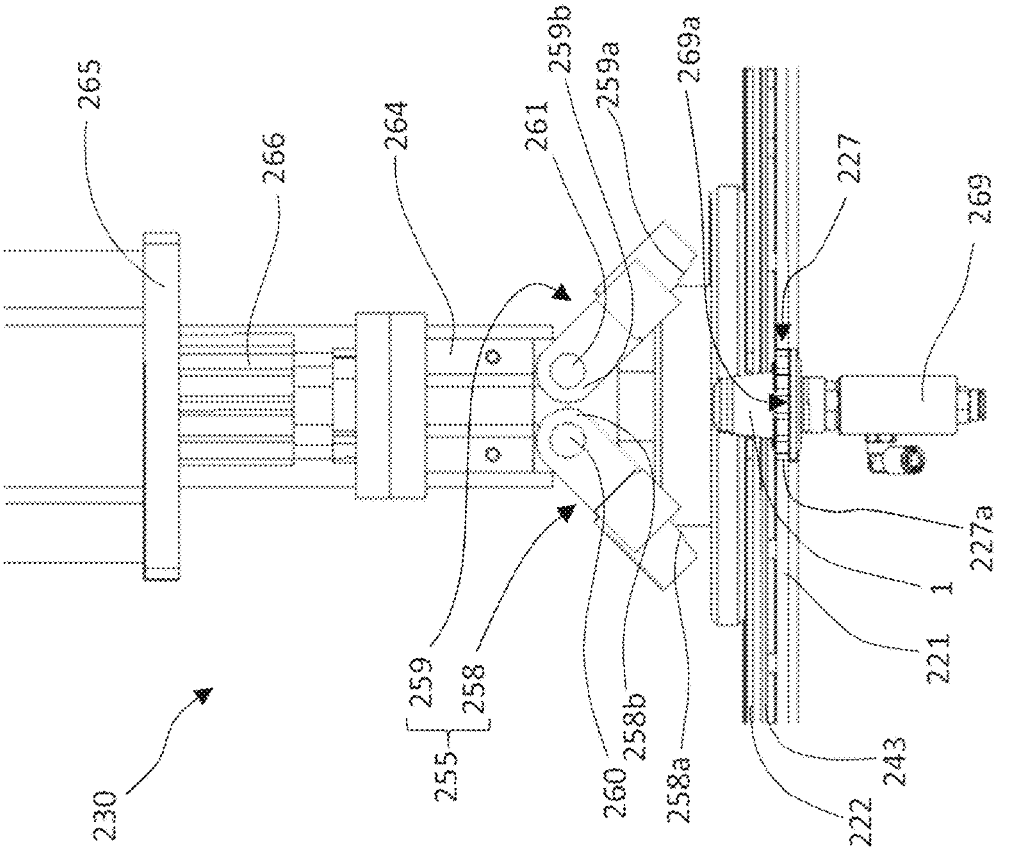
FIG. 12*a* is a front view of an inspection apparatus of the system of FIG. 11 in a first step of the operation thereof.

In a first step, shown in FIG. 12*a*, the jaws 258, 259 of the grippers 255 are in an open position. It should be noted that in this position the jaws 258, 259 do not hinder the transit of the capsules 1 transported by the star conveyor 220, because they are at a height higher than that of the capsules 1. A group G of capsules, dragged by the rotating disk 222 on the slider plate 221, has been carried into the inspection zone 225, stopping on the perforated portion 227 of the slider plate 221. In addition, in this step, the supporting block 264 is in the lowered position.

In a second step, shown in FIG. 12*b*, the jaws 258, 259 of the grippers 255 are brought to the gripping position, gripping the capsules 1 without, however, compressing the shells 2 thereof, while the supporting block 264 is maintained in the lowered position.

Figure 12D:
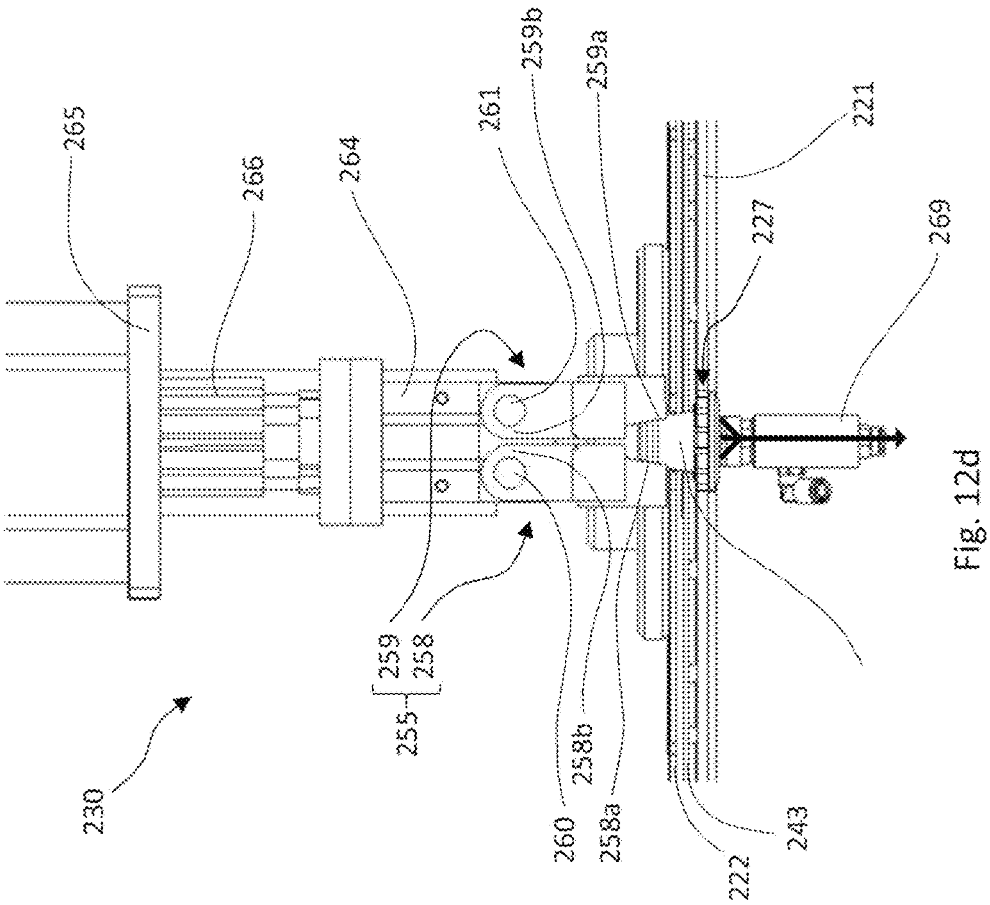
FIG. 12*d* is a front view of an inspection apparatus of the system of FIG. 11 in a fourth step of the operation thereof.
Figure 12C:
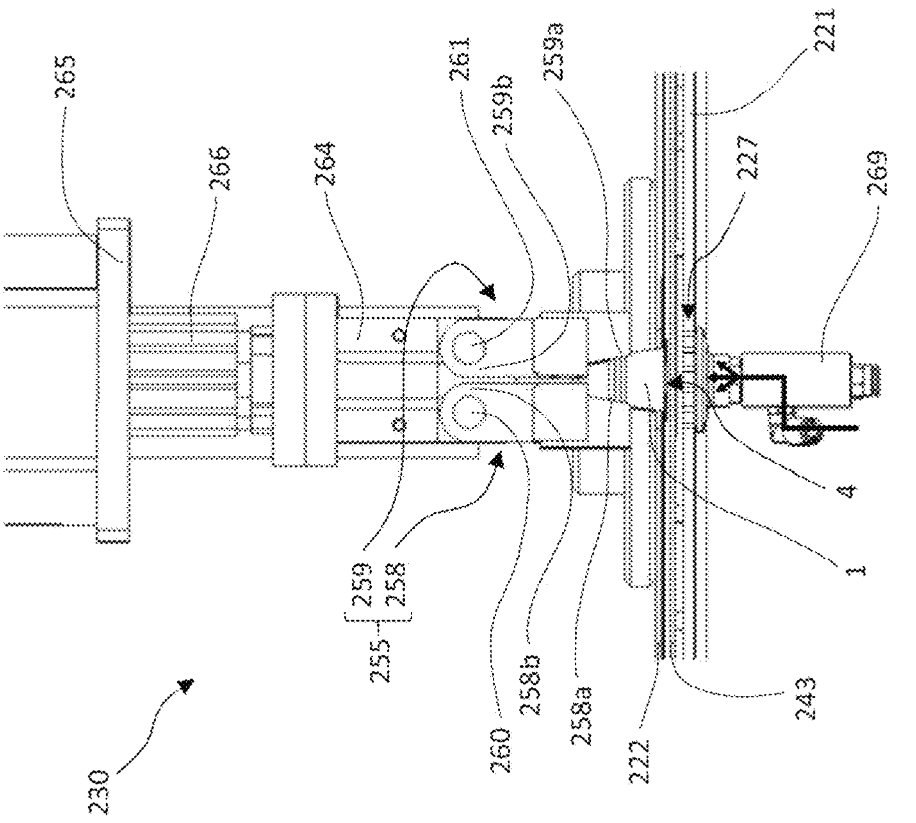
FIG. 12*c* is a front view of an inspection apparatus of the system of FIG. 11 in a third step of the operation thereof.
Figure 15:
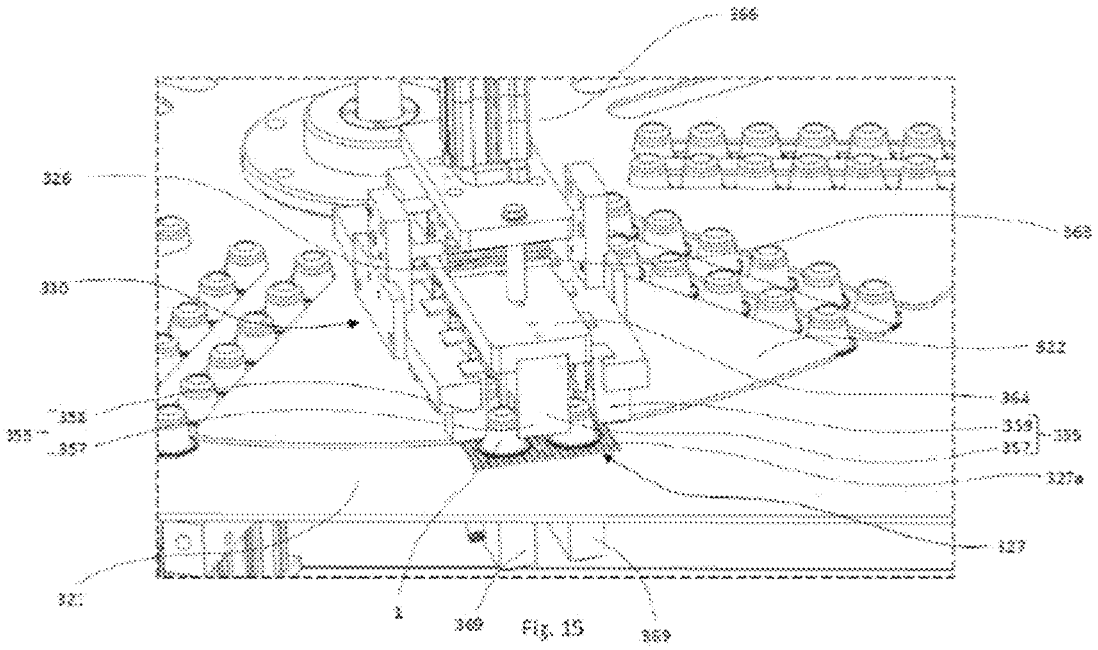
FIG. 15 is a perspective view of a portion of the system of FIG. 14.

In a third step, shown in FIG. 12*c*, the supporting block 264 is brought to the raised position, whereby the capsules 1, gripped by the grippers 255 in the gripping position, are raised therewith, becoming detached from the perforated portion 227 of the slider plate 221 and lifting with respect to the spacer guides 243. The blowing devices are thus activated to direct a gas jet towards the lids 4 of the capsules 1, through the perforated portion 227 of the slider plate 221 (see the arrow shown in FIG. 12*c* and exemplifying the flow direction), in order to remove any residues left by preceding capsules with leaks and clean the detection means. The grippers 255 are then brought to the compression position, compressing the shell 2 of the respective capsules 1 so as to facilitate the release of gas from the inside of the capsules 1 outwards, if the capsules have leaks.

Thanks to the fact that the compression of the shell 2 of the capsules 1 takes place when these are lifted with respect to the spacer guides 243, the shells 2 of the capsules 1 can freely deform without hitting the guides.

In a fourth step, shown in FIG. 12*d*, the supporting block 264 is brought again to the lowered position, and the suction means suck in the gas surrounding each capsule present in the inspection zone 225 (see the arrow shown in FIG. 12*d* and exemplifying the flow direction).

Preferably, the suction means are kept activated not only in the above-mentioned fourth step, but also in the above-mentioned first and second steps.

The above-mentioned operations performed by the inspection apparatus 230 are advantageously carried out simultaneously on all the capsules of each group G of capsules that reaches the inspection zone 225.

The sucked-in gas surrounding each capsule is then guided, through the respective ducts 269, to the detection means for detecting the presence of volatile organic compounds, in particular hydrocarbons such as toluene and benzene. Such detection is effected over the period in which the shells 2 of the capsules 1 present in the inspection zone 225 are compressed by the grippers 255 and preferably ends a few instants after the compression action of the grippers

255 has ended. The system 210 then associates the detection of such compounds to the capsule from which said compounds have been sucked, in order for this defective capsule to be discarded in the following discarding station.

According to the invention, the discarding station is also configured to operate simultaneously on all the capsules of each group G of capsules that reaches the discarding zone 246.

Referring to FIG. 13, a system for detecting leaks from coffee capsules according to a further embodiment of the present invention is indicated by reference numeral 610.

Similarly to the embodiments described above, the system 610 is also an in-line system operating along a line for packaging coffee capsules and is arranged downstream of a capsuling machine, of known type, similar to the previously illustrated one.

According to the present embodiment of the invention, the system 610 comprises an inlet conveyor belt 611 having a plurality of lanes 611*a-f*, in a number equal to the number of lanes on which the capsuling machine arranged upstream operates, an inspection apparatus 630 arranged in an inspection zone 625 located downstream of the inlet conveyor belt 611, and an outlet conveyor belt 648 arranged downstream of the inspection zone 625 and having a plurality of lanes 648*a-f*.

Preferably, upstream of the inspection zone 625 there is provided a gate 670*a* configured to stop and allow, alternately, the forward movement of the capsules 1 on the respective lanes 611*a-f* of the inlet conveyor belt 611. The gate 670*a* is closed to allow the inspection apparatus to inspect the capsules present in the inspection zone 625 and opened again to allow further capsules to reach the inspection zone when the former inspection is completed. Preferably, there is further provided an additional gate 670*b* along the outlet conveyor belt 648. Alternatively, the two inlet 611 and outlet 648 conveyor belts are actuated intermittently and synchronously with the inspection apparatus 630, stopping during an inspection in the inspection apparatus 630 and moving forward when the inspection is completed, to introduce new capsules into the inspection zone 625.

The forward movement of the capsules 1 from the inlet conveyor belt to the inspection zone and then to the outlet conveyor belt 648 can be guaranteed in several manners. For example, the two inlet 611 and outlet 648 conveyor belts as well as the inspection apparatus 630 can be inclined, so that the capsule 1 slide by themselves. Alternatively, the capsules 1 can move forward by virtue of the thrust exerted by the preceding capsules. A further alternative provides for using suitable mechanical means (for example, augers) adapted to move the capsules 1 forward in a well-spaced and paced manner.

The inspection apparatus 630 of the detection system 610 is configured to test the tightness of the capsules 1 (already filled with coffee and sealed) and comprises extraction means and suction means, configured to induce the release of volatile substances from each capsule received and suck in gas surrounding each capsule received and thus any volatile substances leaked from said capsule, and detection means, configured to analyze the sucked-in gas and detect the presence of any volatile substances leaked from each capsule received.

The inspection apparatus 630 is similar to the inspection apparatus 230 of the previous embodiment. For a detailed description of the inspection apparatus 630, only shown schematically in FIG. 13, and the operation thereof, reference is therefore made to the description of the inspection apparatus 230 and corresponding FIGS. 12*a-d*.

A variant, not shown, of the above-mentioned embodiment provides for a conveyor belt comprising a single lane and an inspection apparatus comprising a single gripper.

Referring to FIGS. 14 e 15, a system for detecting leaks from coffee capsules according to a further embodiment of the present invention is indicated by reference numeral 310.

The system 310 is, like the ones previously described, an in-line system and comprises two inlet conveyor belts 311*a*, 311*b*, a star conveyor 320, configured to receive the capsules transported by the inlet conveyor belts 311*a*, 311*b*, and an inspection apparatus 330, associated with the star conveyor 320 and configured to test the tightness of the capsules (already filled with coffee and sealed) transported by said star conveyor 320.

The system 310 further comprises, preferably, a discarding station 345 configured to discard the capsules with leaks, and two outlet conveyor belts 348*a*, 348*b*.

Some components of the system 310, including the inlet conveyor belts 311*a*, 311*b*, the star conveyor 320, the discarding station 345 and the outlet conveyor belts 348*a*, 348*b* are essentially the same as those present in the previous embodiment (systems 10 and 210). In particular, the inlet conveyor belts 311*a*, 311*b* of the system 310 are also preferably provided with means, for example, two pairs of stoppers 312*a*, 313*a*, 312*b*, 313*b*, for dividing the incoming capsules into groups G of capsules having a predetermined number of capsules. In addition, preferably, upstream of the two inlet conveyor belts 311*a*, 311*b* there is provided a single main inlet conveyor belt 350, along which a stopper 367 (or, alternatively, a pair of stoppers) and a two-way diverter 351, of known type, are arranged, in order to divert the capsules alternately onto the two inlet conveyor belts 311*a*, 311*b*. In addition, downstream of the two outlet conveyor belts 348*a*, 348*b* there is provided a single main outlet conveyor belt (not shown) to which the groups of capsules present on the two outlet conveyor belts 348*a*, 348*b* are conveyed.

The star conveyor 320 also comprises, as in the previous embodiments (systems 10 and 210), a fixed slider plate 321, on which the capsules 1 rest, and a rotating disk 322, with intermittent rotation, having a plurality of radial compartments 323*a*. 323*b*, for receiving, in an entry zone 324, the capsules arriving from the two inlet conveyor belts 311*a*, 311*b* and move them, by means of its rotation, so that they arrive at an inspection zone 325 of the star conveyor 320, in which the inspection apparatus 330 is arranged, a following discarding zone 346 of the star conveyor 320, in which the discarding station 345 is arranged, and finally an outlet zone 349 of the star conveyor 320, in which the capsules that have not been discarded are introduced onto the outlet conveyor belts 348*a*. 348*b*. Preferably, means for dividing the exiting capsules into groups of capsules, for example, a stopper 352, are provided also along one 348*a* of the outlet conveyor belts. This stopper 352 is actuated in order to stop a group of exiting capsules on the outlet conveyor belt 348*a* and allow the other group of capsules present on the outlet conveyor belt 348*b* to be conveyed onto the main outlet conveyor belt (not shown).

In addition, the star conveyor 320 also comprises spacer guides 343, like those previously described with reference to FIG. 9, said spacer guides being arranged between the rotating disk 322 and the slider plate 321 and configured to create a radial spacing between the capsules of a same group G so that said capsules arrive at the inspection zone 325 properly spaced from one another.

Similarly to what has been described above in connection with the embodiment of FIG. 11 (system 210), also in the present embodiment, at the inspection zone 325, the slider plate 321 of the star conveyor 320 has a perforated portion 327 such as to allow the passage of air, as will be illustrated below, and simultaneously allow the capsules to slide thereon without any obstacles.

For a more detailed description of the components of the system 310 that are the same as those of the previous embodiments (systems 10 and 210), reference is made to the description of said embodiments; the following description, instead, is focused mainly on the inspection apparatus 330 of the system 310.

The inspection apparatus 330 is configured to test the tightness of the capsules 1, for example, though not exclusively, at the sealing region between the lid 4 and the rim 3 of the shell 2 of the capsules 1. This apparatus comprises extraction means and suction means, configured to induce the release of volatile substances from each capsule received and suck in gas surrounding each capsule received, and thus any volatile substances leaked from said capsule, and detection means, configured to analyze the sucked-in gas and detect the presence of any volatile substances leaked from each capsule received.

The extraction means of the inspection apparatus 330 comprise a plurality of grippers 355, 356, divided in two columns, each column comprising a number of grippers equal to (or larger than) the number of capsules of each group G of capsules formed on the inlet conveyor belt 311*a*, 311*b*. The two columns of grippers 355, 356 are arranged in a radial direction with respect to the star conveyor 320 with which the inspection apparatus 330 is associated. The grippers 355, 356 are mounted on a supporting block 364, which in turn is mounted movably, in a vertical direction, on a fixed supporting structure 365. The supporting block 364 is moved by means of an actuator, for example, a pneumatic cylinder 366, from a raised position to a lowered position.

Figure 16:
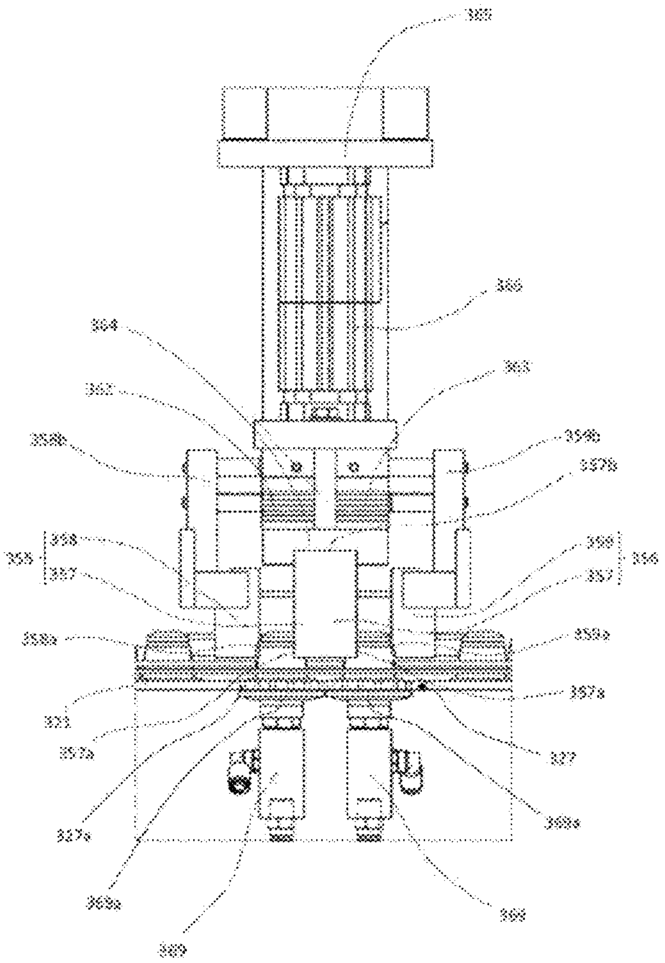
FIG. 16 is a front view of an inspection apparatus of the system of FIG. 14.

Referring in particular to FIG. 16, each gripper 355, 356 of the inspection apparatus 330 comprises a first jaw 357 and a second jaw 358, 359, which jaws have first ends 357*a*, 358*a*, 359*a* configured to exert a pressure against the shell 2 of the capsules 1. The first jaw 357 is fixedly mounted, at a second end 357*b* thereof, to the supporting block 364, whereas the second jaw 358, 359 is movably mounted, at a second end thereof 358*b*, 359*b*, to the supporting block 364, so as to be able to perform a translation movement, parallel to the slider plate 321, from an open position, in which the second jaw 358, 359 is distal to the first jaw 357, to a gripping position, in which the second jaw 358, 359 is distanced from the first jaw 357 so that they can grip a capsule 1 located therebetween without compressing the shell 2 of the capsule, and to a compression position, in which the second jaw 358, 359 is proximal to the first jaw 357 so as compress the shell 2 of the coffee capsule 1 located therebetween. The second jaws 358, 359 of the two columns of grippers 355, 356 are moved by means of suitable actuators, for example, two respective pneumatic cylinders 362, 363, preferably in a simultaneous manner. Preferably, the grippers 355 of a column share the first jaw 357 with the grippers 356 of the other column.

According to the present embodiment, the inspection apparatus 330 comprises a plurality of ducts 369, arranged in two columns below the slider plate 321. Each of said ducts 369 has an end 369*a* open towards the perforated portion 327 of the slider plate 321 and vertically aligned to a corresponding gripper 355, 356 of the extraction means. In addition, each of said ducts 369 is connected to suction means (not shown), configured to suck in gas from the inspection 325 through the duct 369, the open end 369*a* and the perforated portion 327, and, preferably, to blowing devices (not shown), adapted to introduce gas into the inspection zone 325, through the duct 369, the open end thereof 369*a* and the perforated portion 327.

In addition, each duct 369 is connected to the detection means (not shown). The detection means are sensors, of known type, for volatile organic compounds (VOC), including hydrocarbons such as toluene and benzene, and each duct 369 is connected to a respective sensor thereof or to a plurality of sensors thereof sensitive to distinct volatile compounds.

Referring to FIGS. 17*a-d*, the steps of operation of the inspection apparatus 330 are illustrated below.

Figure 17B:
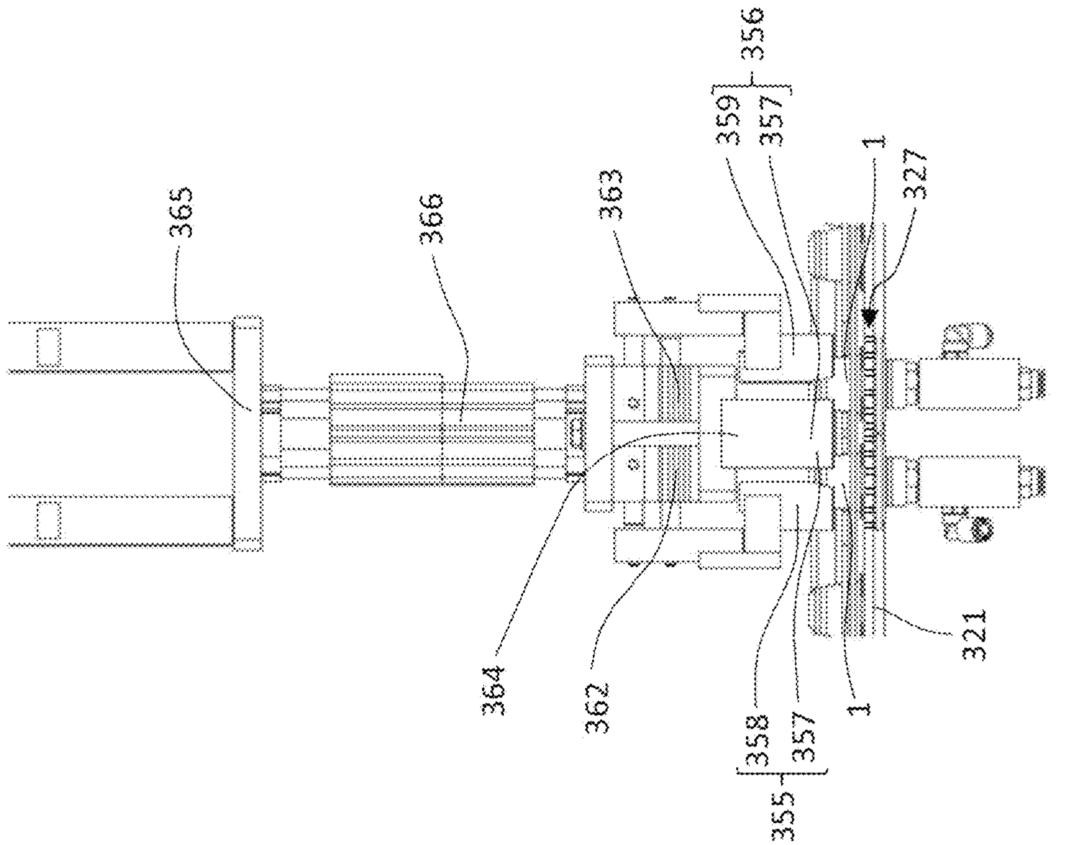
FIG. 17*b* is a front view of an inspection apparatus of the system of FIG. 14 in a second step of the operation thereof.
Figure 17A:
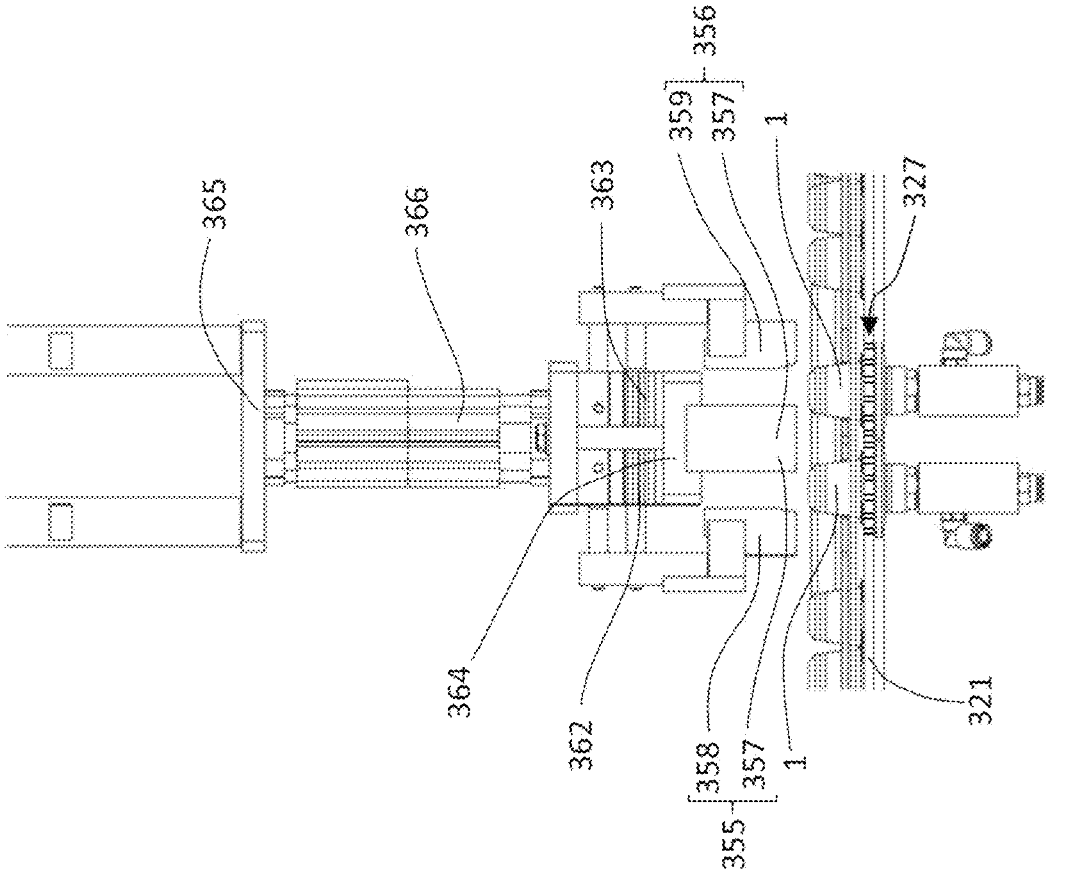
FIG. 17*a* is a front view of an inspection apparatus of the system of FIG. 14 in a first step of the operation thereof.

In a first step, shown in FIG. 17*a*, the supporting block 364 is in the raised position and the second jaws 358, 359 of the grippers 355, 356 are in the open position. A group G of capsules, dragged by the rotating disk 322 on the slider plate 321, has been brought to the inspection zone 325, stopping on the perforated portion 327 of the slider plate 321. It should be noted that, when the supporting block 364 is in the raised position, the jaws 357, 358, 359 of the grippers 355, 356 do not hinder the transit of the capsules 1 transported by the star conveyor 320, because they are at a height higher than that of the capsules 1.

In a second step, shown in FIG. 17*b*, the supporting block 364 is brought to the lowered position and the second jaws 358, 359 of the grippers 355, 356 are brought to the gripping position, gripping the capsules 1 without, however, compressing the shells 2 thereof.

Figure 17D:
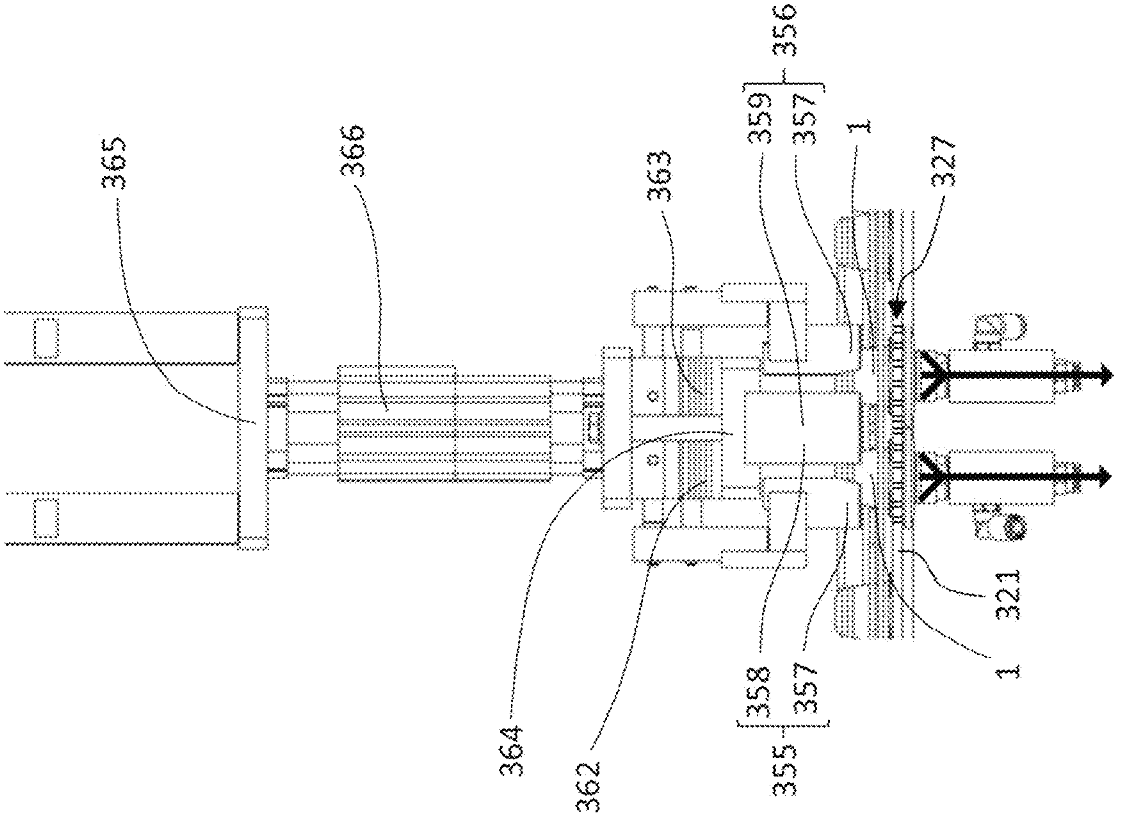
FIG. 17*d* is a front view of an inspection apparatus of the system of FIG. 14 in a fourth step of the operation thereof.
Figure 17C:
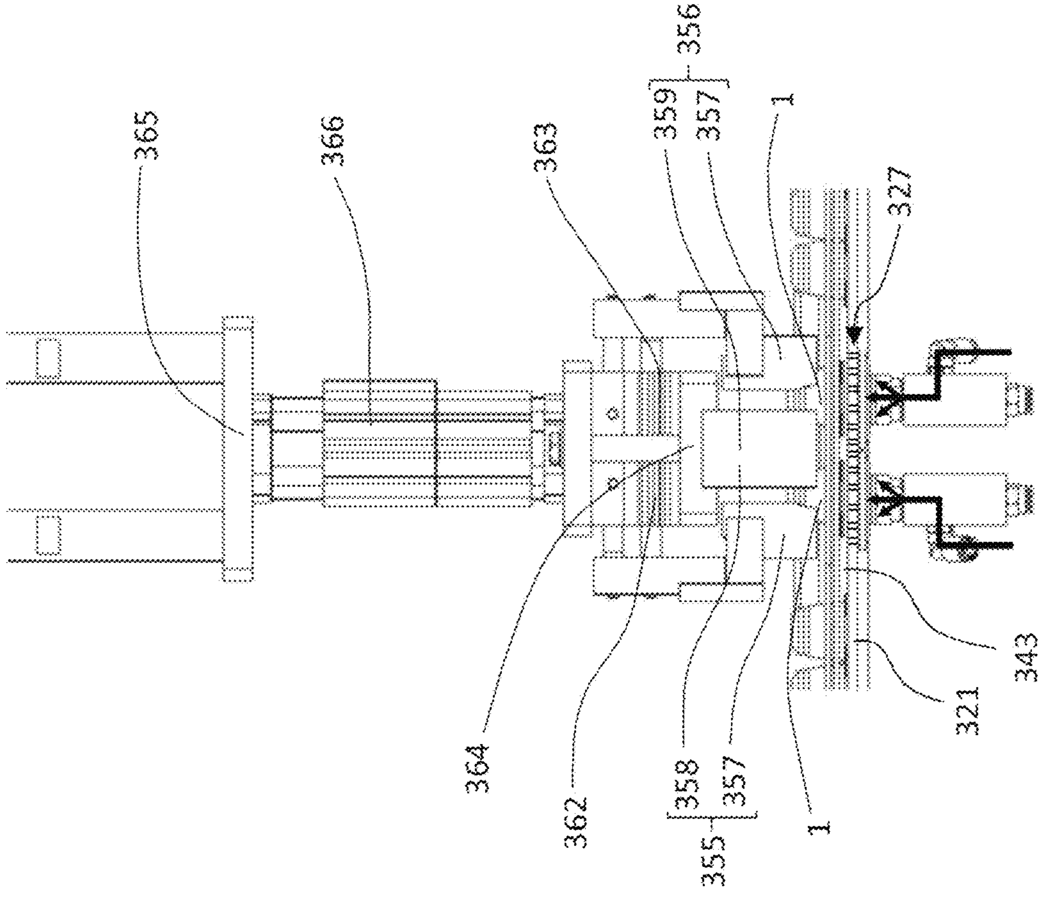
FIG. 17*c* is a front view of an inspection apparatus of the system of FIG. 14 in a third step of the operation thereof.

In a third step, shown in FIG. 17*c*, the supporting block 364 is raised, whereby the capsules 1, gripped by the grippers 355, 356 in the gripping position, are raised therewith, becoming detached from the perforated portion 327 of the slider plate 321 and lifting with respect to the spacer guides 343. The blowing devices are thus activated to direct a gas jet towards the lids 4 of the capsules 1, through the perforated portion 327 of the slider plate 321 (see the arrow shown in FIG. 17*c* and exemplifying the flow direction), in order to remove any residues left by preceding capsules with leaks and clean the detection means. The grippers 355, 356 are then brought to the compression position, compressing the shell 2 of the respective capsules 1 so as to facilitate the release of gas from the inside of the capsules 1 outwards, if the capsules have leaks.

Thanks to the fact that the compression of the shell 2 of the capsules 1 takes place when these are lifted with respect to the spacer guides 343, the shells 2 of the capsules 1 can freely deform without hitting the guides.

In a fourth step, shown in FIG. 17*d*, the supporting block 364 is brought again to the lowered position, and the suction means are activated to suck in the gas surrounding each capsule present in the inspection zone 325 (see the arrow shown in FIG. 17*d* and exemplifying the flow direction).

Preferably, the suction means are kept activated not only in the above-mentioned fourth step, but also in the above-mentioned first and second steps.

The above-mentioned operations performed by the inspection apparatus 330 are advantageously carried out simultaneously on all the capsules 1 of each group G of capsules that reaches the inspection zone 325.

The sucked-in gas surrounding each capsule 1 is then guided, through the respective ducts 369, to the detection means for detecting the presence of volatile organic compounds, in particular hydrocarbons such as toluene and benzene. Such detection is effected over the period in which the shells 2 of the capsules 1 present in the inspection zone 325 are compressed by the grippers 355, 356 and preferably ends a few instants after the compression action of the grippers 355, 356 has ended. The system 310 then associates the detection of such compounds to the capsule from which said compounds have been sucked, in order for this defective capsule to be discarded in the following discarding station 345.

Figure 18:
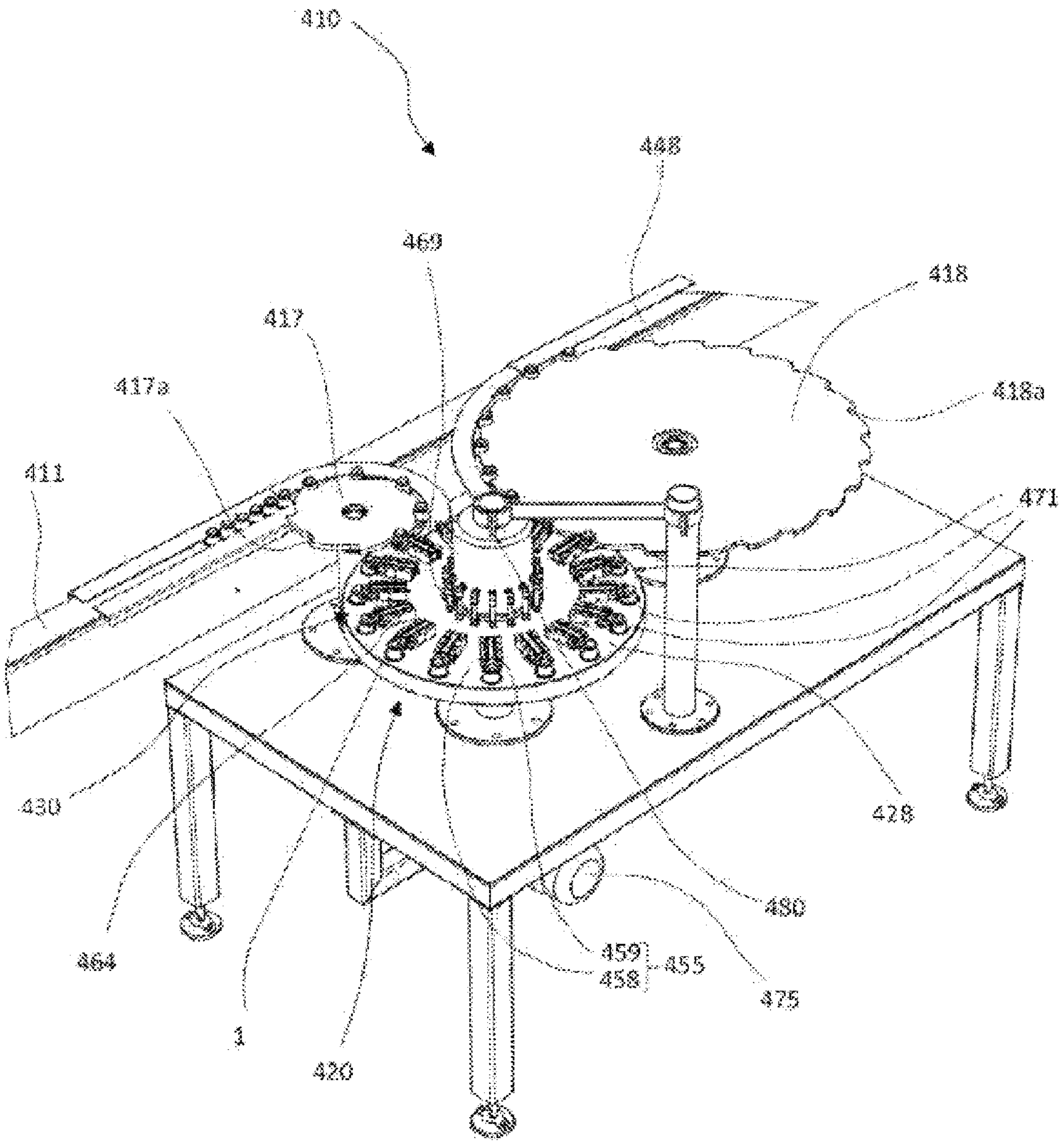
FIG. 18 is a perspective view of a system for detecting leaks from coffee capsules according to a further embodiment of the present invention.

Referring to FIGS. 18 e 19, a system for detecting leaks from coffee capsules according to a further embodiment of the present invention is indicated by reference numeral 410.

Similarly to the previous embodiments, the system 410 is also an in-line system operating along a line for packaging coffee capsules and is arranged downstream of a capsuling machine, of known type.

According to the present embodiment of the invention, the system 410 comprises an inlet conveyor belt 411, for conveying the sealed capsules arriving from said capsuling machine of the packaging line into the system, a first star conveyor 420, rotary, configured to receive the capsules 1 arriving from the inlet conveyor belt 411, and an inspection apparatus 430, associated with the star conveyor 420 and configured to test the tightness of the capsules 1 (already filled with coffee and sealed) transported by said first star conveyor 420.

The system 410 further comprises, preferably, a second star conveyor (or inlet star conveyor) 417, rotary, configured to receive the capsules 1 transported by the inlet conveyor belt 411 and feed them to the first star conveyor 420, a third star conveyor (or outlet star conveyor) 418, rotary, configured to receive the capsules 1 from the first star conveyor 420, and an outlet conveyor belt 448, which receives the capsules 1 from the outlet star conveyor 418, so that said capsules are re-introduced into the packaging line. The outlet conveyor belt 448 can be a continuation of the inlet conveyor belt 411 (as shown in FIGS. 18 e 19) or a separate belt.

The capsules are preferably moved, both on the conveyor belts 411, 448 and on the star conveyors 417, 418, 420, while resting on respective lids 4.

The inlet star conveyor 417 comprises a plurality of hook-shaped seats 417*a*, arranged along the perimeter of the conveyor, preferably uniformly spaced, each seat being configured to pick up a capsule 1 from the inlet conveyor belt 411 and transfer it to an entry zone 424 of the first star conveyor 420. The inlet star conveyor 417 further has the purpose of creating an appropriate pitch between the capsules 1, which pitch has to be maintained on the first star conveyor 420.

The outlet star conveyor 418 also comprises a plurality of hook-shaped seats 418*a*, arranged along the perimeter of the conveyor, preferably uniformly spaced, each seat being configured to pick up a capsule 1 from an outlet zone 449 of the first star conveyor 420 and transfer it onto the outlet conveyor belt 448.

Referring to FIG. 20, preferably, the three star conveyors 417, 418, 420 have a continuously synchronized movement, and they are moved by means of a single motor drive 475 and a toothed wheel transmission, comprising a first, a second and a third toothed wheel 476, 477, 478 associated with the first, second and third star conveyor 420, 417, 418, respectively. In particular, each toothed wheel 476, 477, 478 is coaxial to and integral in rotation with the respective star conveyor 420, 417, 418.

On the first star conveyor 420, the capsules 1 are positioned, resting on a rotating transport plate 428 of the star conveyor 420, in a plurality of circularly arranged, preferably uniformly spaced, locations 471. During the rotational movement of the first star conveyor 420, each location 471 occupies in turn the entry zone 424, where the first star conveyor 420 receives a capsule 1 from the inlet star conveyor 417, and the outlet zone 449, where the outlet star conveyor 418 picks up a capsule 1 from the first star conveyor 420.

At each location 471, the transport plate 428 has perforated portions (not visible in FIGS. 18 and 19, being covered by the respective capsules 1), so as to allow the passage of air, as will be illustrated below.

As mentioned above, the inspection apparatus 430 is configured to test the tightness of the capsules 1, for example, though not exclusively, at the sealing region between the lid 4 and the rim 3 of the shell 2 of the capsules. This apparatus comprises extraction means and suction means, configured to induce the release of volatile substances from each capsule received and suck in gas surrounding each capsule received, and thus any volatile substances leaked from said capsule, and detection means, configured to analyze the sucked-in gas and detect the presence of any volatile substances leaked from each capsule received.

Referring in particular to FIG. 21, the extraction means of the inspection apparatus comprise a plurality of grippers 455, each arranged at a location 471 of the first star conveyor 420 and comprising two jaws 458, 459, movable, having first ends 458*a*, 459*a* configured to exert a pressure against the shell 2 of the capsules 1 and second ends 458*b*, 459*b* movably mounted to a respective supporting block 464. For example, the jaws 458, 459 can be hinged to the supporting block 464 so as to be able to perform a rotational movement about the respective hinges, or they can be mounted so as to perform a translation movement. The movement of the jaws 458, 459, obtained by means of suitable actuators, either pneumatic or mechanical, allows them to move from an open position, in which the first ends 458*a*, 459*a* of the jaws 458, 459 are distal to each other, to a compression position, in which the first ends 458*a*, 459*a* are proximal to each other and compress the shell 2 of the coffee capsule 1 located therebetween. If the jaws 458, 459 of the grippers are actuated mechanically, it is possible to move them by means of a cam, because the opening and closing cycle of the grippers 455 during the rotation of the first star conveyor 420 is the same for all the grippers 455.

According to the present embodiment, the inspection apparatus 430 comprises a plurality of ducts 469, each for each location 471. Each of said ducts 469 has an end portion (not visible in FIGS. 18, 19 and 21), located below the slider plate 428 of the first star conveyor 420, which end portion terminates with an end (not shown) open towards the perforated portion of the respective location 471. In addition, each of said ducts 469 is connected to suction means, for example, a rotary pneumatic collector 480, arranged to suck in gas from each location 471 in an independent manner. Preferably, these suction means are activated so as to suck in gas from all the locations 471 occupied by the capsules 1, in order to create a vacuum that contributes to hold the capsules 1 in their respective locations 471. Each of the ducts 469 is further connected, preferably, to blowing devices (not show), arranged to blow gas towards the locations 471 through the ducts 469 and the perforated portions of each location 471.

According to the present embodiment, at the locations 471 of the first star conveyor 420 that are between the entry zone 424 and the outlet zone 449, i.e. in the so-called inspection zone 425, the jaws 458, 459 of the grippers 455 are brought to the compression position, compressing the shell 2 of the respective capsules 1 so as to facilitate the release of gas from the inside of the capsules 1 outwards, if the capsules have leaks.

The sucked-in gas surrounding each capsule 1 present in the inspection zone 425 is then guided, through the respective ducts 469, to the detection means (not shown). The detection means are sensors, of known type, for volatile organic compounds (VOC), for detecting the presence of volatile organic compounds, in particular hydrocarbons such as toluene and benzene, and each duct 469 is connected to a respective sensor thereof or to a plurality of respective sensors thereof sensitive to distinct volatile compounds. Said detection is effected over the period in which the shells 2 of the capsules 1 present in the inspection zone 425 are compressed by the grippers 455 and preferably ends a few instants after the compression action of the grippers 455 has ended. The system 410 then associates the detection of such compounds to the location 471 and thus to the capsule from which said compounds have been sucked, in order for this defective capsule to be subsequently discarded.

The system 410 comprises, preferably, a discarding station (not shown) configured to discard those capsules that have leaks. Said discarding station is, for example, associated with the first star conveyor 420 and comprises sucker-like suction devices capable of picking up from above the capsules to be discarded. Alternatively, the discarding station is located downstream of the outlet conveyor belt 448.

The systems for detecting leaks from coffee capsules as described and illustrated are susceptible to further variants and modifications falling within the same inventive principle. According to further embodiments, the detections systems described and illustrated above can be used for detecting leaks from capsules containing other foods releasing volatile organic compounds, for example, tea or chocolate capsules, or for detecting leaks from other types of semi-rigid or soft containers such as sachets, provided that they contain foods releasing volatile organic compounds, for example, sachets containing ketchup, mayonnaise or mustard.

The detection means according to the embodiments shown in FIGS. 2-10 can also be used for detecting leaks from rigid containers, for example, ampoules or vials containing drugs or cosmetics, if these release volatile organic components, e.g. ethyl alcohol.

The invention claimed is:

1. A system (10; 510) for detecting leaks from containers, the system comprising:

conveying means, comprising at least one inlet conveyor belt (11*a*, 11*b*; 111; 511), said means being configured to transport containers (1), already filled with a given food and sealed, to an inspection zone (25; 525), and an inspection apparatus (30; 530), configured to test the tightness of containers (1) arrived at the inspection zone (25; 525), said inspection apparatus (30; 530) comprising extraction means configured to induce the release of volatile substances from each container (1) arrived at the inspection zone (25; 525), suction means configured to suck in gas surrounding each of said containers (1) and any volatile substances leaked from said containers (1), and detection means configured to analyze the sucked-in gas and detect the presence of any volatile substances leaked from said containers (1), wherein the extraction means of the inspection apparatus (30; 530) comprise one or more plungers (31), movably mounted in respective seats (34), said plungers (31) being configured to move from a raised position, in which an upper surface (31*a*) of the plungers (31) is adapted to receive a container (1), and a lowered position, in which the container (1) is carried into the seat (34) of the plunger (31), wherein the inspection apparatus (30; 530) further comprises a cover (37) configured to close said seats (34) when the containers (1) are within the seats (34), whereby each container (1) is enclosed within a respective chamber (41) defined by the upper surface (31*a*) of the respective plunger (31), the respective seat (34), and the cover (37), wherein a respective channel (32) is formed within each plunger (31), each channel (32) having an end (32*a*) open towards the upper surface (31*a*) of the respective plunger (31) and being connected to the suction means, said suction means being configured to suck in gas from the seat (34) associated with the respective plunger (31), through the channel (32) of the plunger and the open end thereof (32*a*), and wherein each channel (32) is further connected to the detection means.

2. The system (10; 510) according to claim 1, wherein said detection means comprise sensors for volatile organic compounds.

3. The system (10; 510) according to claim 1, wherein each channel (32) is connected to blowing devices, adapted to introduce gas into the respective seat (34) through the channel (32) of the plunger (31) and the open end thereof (32*a*).

4. The system (10; 510) according to claim 1, wherein said containers (1) are coffee capsules.

5. The system (10) according to claim 1, wherein the conveying means further comprise a star conveyor (20; 120), configured to receive the containers (1) arriving from the at least one inlet conveyor belt (11*a*, 11*b*; 111).

6. The system (10) according to claim 5, wherein the star conveyor (20; 120) comprises a fixed slider plate (21), on which the containers (1) received from the at least one inlet conveyor belt (11*a*, 11*b*; 111) rest, and a rotating disk (22; 122), comprising a plurality of radial compartments (23*a*, 23*b*; 123), each configured to receive, in an entry zone (24; 124) of the star conveyor (20; 120), a group (G) of containers (1) arriving from the at least one inlet conveyor belt (11*a*, 11*b*; 111), and to move said group (G) of containers (1), by means of the rotation of the rotating disk (22; 122), dragging and sliding the containers (1) on the fixed slider plate (21) so that they reach the inspection zone (25).

7. The system (10) according to claim 6, wherein, along the at least one inlet conveyor belt (11*a*, 11*b*; 111), means (12*a*, 13*a*, 12*b*, 13*b*; 112, 113) for dividing the incoming containers into groups (G) of containers are provided, said groups comprising a predetermined number of containers.

8. The system (10) according to claim 6, wherein the star conveyor (20; 120) comprises spacer guides (43), arranged between the rotating disk (22; 122) and the fixed slider plate (21) and configured to create a radial spacing between the containers (1) of a same group (G) so that said containers arrive at the inspection zone (25) properly spaced from one another.

9. A system (210; 310; 410; 610) for detecting leaks from containers, the system comprising:

conveying means, comprising at least one inlet conveyor belt (211; 311*a*, 311*b*; 411; 611), said means being configured to transport containers (1), already filled with a given food and sealed, to an inspection zone (225; 325; 425; 625), and an inspection apparatus (230; 330; 430; 630), configured to test the tightness of containers (1) arrived at the inspection zone (225; 325; 425; 625), said inspection apparatus (230; 330; 430; 630) comprising extraction means configured to induce the release of volatile substances from each container (1) arrived at the inspection zone (225; 325; 425; 625), suction means configured to suck in gas surrounding each of said containers (1) and any volatile substances leaked from said containers (1), and detection means configured to analyze the sucked-in gas and detect the presence of any volatile substances leaked from said containers (1), wherein the extraction means (230; 330; 430; 630) of the inspection apparatus comprise one or more grippers (255; 355, 356; 455) and respective ducts (269; 369; 469), wherein each gripper (255; 355, 356; 455) comprises two jaws (258, 259; 357, 358, 359; 458, 459) configured to be moved from an open position to a closed compression position, in which they compress, in the inspection zone (225; 325; 425; 625), a respective container (1) located between said jaws (258, 259; 357, 358, 359; 458, 459), wherein each duct (269; 369; 469) has an end (269*a*; 369*a*) open towards the inspection zone (225; 325; 425; 625) and connected to the suction means, said suction means being configured to suck in gas surrounding the containers (1) compressed by the grippers (255; 355, 356; 455) through the respective ducts (269; 369; 469) and the open ends thereof (269*a*; 369*a*), and wherein each duct (269; 369; 469) is further connected to the detection means.

10. The system (210; 310; 410; 610) according to claim 9, wherein each duct (269; 369; 469) is connected to blowing devices, adapted to introduce gas into the inspection zone (225; 325; 425; 625) through each duct (269; 369; 469) and the open end thereof (269*a*; 369*a*).

11. The system (210; 310; 410; 610) according to claim 9, wherein said containers (1) are coffee capsules.

12. The system (210; 310; 410) according to claim 9, wherein the conveying means further comprise a star conveyor (120; 220; 320; 420), configured to receive the containers (1) arriving from the at least one inlet conveyor belt (211; 311*a*, 311*b*; 411).

13. The system (210; 310; 410) according to claim 12, wherein, at the inspection zone (225; 325; 425), the star conveyor (220; 320; 420) has at least one perforated portion (227; 327), on which the containers (1) rest, the holes (227*a*; 327*a*) of said perforated portion (227; 327) allowing the suction means to suck in gas surrounding the containers (1) through the ducts (269; 369; 469) arranged below the star conveyor (220; 320; 420) and the open ends thereof (269*a*; 369*a*) facing said perforated portion (227; 327).

14. The system (210; 310) according to claim 12, wherein the star conveyor (220; 320) comprises a fixed slider plate (221; 321), on which the containers (1) received from the at least one inlet conveyor belt (211; 311*a*, 311*b*) rest, and a rotating disk (222; 322), comprising a plurality of radial compartments (223; 323*a*, 323*b*), each configured to receive, in an entry zone (224; 324) of the star conveyor (220; 320), a group (G) of containers (1) arriving from the at least one inlet conveyor belt (211; 311*a*, 311*b*), and to move said group (G) of containers (1), by means of the rotation of the rotating disk (222; 322), dragging and sliding the containers (1) on the fixed slider plate (221; 321) so that they reach the inspection zone (225; 325).

15. The system (210; 310) according to claim 14, wherein, along the at least one inlet conveyor belt (211; 311*a*, 311*b*), means (212, 213; 312*a*, 313*a*, 312*b*, 313*b*) for dividing the incoming containers into groups (G) of containers are provided, said groups comprising a predetermined number of containers.

16. The system (210; 310) according to claim 14, wherein the star conveyor (220; 320) comprises spacer guides (243; 343), arranged between the rotating disk (222; 322) and the fixed slider plate (221; 321) and configured to create a radial spacing between the containers (1) of a same group (G) so that said containers arrive at the inspection zone (225; 325) properly spaced from one another.

17. A system (10; 210; 310) for detecting leaks from containers, the system comprising:

conveying means, comprising at least one inlet conveyor belt (11*a*, 11*b*; 111; 211; 311*a*, 311*b*), said means being configured to transport containers (1), already filled with a given food and sealed, to an inspection zone (25; 225; 325), and an inspection apparatus (30; 230; 330), configured to test the tightness of containers (1) arrived at the inspection zone (25; 225; 325), said inspection apparatus (30; 230; 330) comprising extraction means configured to induce the release of volatile substances from each container (1) arrived at the inspection zone (25; 225; 325), suction means configured to suck in gas surrounding each of said containers (1) and any volatile substances leaked from said containers (1), and detection means configured to analyze the sucked-in gas and detect the presence of any volatile substances leaked from said containers (1), wherein the conveying means further comprise a star conveyor (20; 120; 220; 320), configured to receive the containers (1) arriving from the at least one inlet conveyor belt (11*a*, 11*b*; 111; 211; 311*a*, 311*b*), and wherein the star conveyor (20; 120; 220; 320) comprises a fixed slider plate (21; 221; 321), on which the containers (1) received from the at least one inlet conveyor belt (11*a*, 11*b*; 111; 211; 311*a*, 311*b*) rest, and a rotating disk (22; 122; 222; 322), comprising a plurality of radial compartments (23*a*, 23*b*; 123; 223; 323*a*, 323*b*), each configured to receive, in an entry zone (24; 124; 224; 324) of the star conveyor (20; 120; 220; 320), a group (G) of containers (1) arriving from the at least one inlet conveyor belt (11*a*, 11*b*; 111; 211; 311*a*, 311*b*), and to move said group (G) of containers (1), by means of the rotation of the rotating disk (22; 122; 222; 322), dragging and sliding the containers (1) on the fixed slider plate (21; 221; 321) so that they reach the inspection zone (25; 225; 325).

18. The system (210; 310) according to claim 17, wherein, along the at least one inlet conveyor belt (211; 311*a*, 311*b*), means (212, 213; 312*a*, 313*a*, 312*b*, 313*b*) for dividing the incoming containers into groups (G) of containers are provided, said groups comprising a predetermined number of containers.

19. The system (210; 310) according to claim 17, wherein the star conveyor (220; 320) comprises spacer guides (243; 343), arranged between the rotating disk (222; 322) and the fixed slider plate (221; 321) and configured to create a radial spacing between the containers (1) of a same group (G) so that said containers arrive at the inspection zone (225; 325) properly spaced from one another.

20. The system (210; 310) according to claim 17, wherein said containers (1) are coffee capsules.

* * * * *